(12) United States Patent
Sun et al.

(10) Patent No.: US 11,672,034 B2
(45) Date of Patent: Jun. 6, 2023

(54) CHANNEL OCCUPANCY TIME (COT) SHARING FOR SIDELINK

(71) Applicant: QUALCOMM INCORPORATED, San Diego, CA (US)

(72) Inventors: Jing Sun, San Diego, CA (US); Xiaoxia Zhang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 16/948,547

(22) Filed: Sep. 23, 2020

(65) Prior Publication Data

US 2021/0092783 A1    Mar. 25, 2021

Related U.S. Application Data

(60) Provisional application No. 62/905,962, filed on Sep. 25, 2019.

(51) Int. Cl.
*H04W 76/14*   (2018.01)
*H04W 74/08*   (2009.01)
(Continued)

(52) U.S. Cl.
CPC ......... *H04W 76/14* (2018.02); *H04W 74/002* (2013.01); *H04W 74/085* (2013.01); *H04W 74/0875* (2013.01); *H04W 76/15* (2018.02)

(58) Field of Classification Search
None
See application file for complete search history.

(56) References Cited

U.S. PATENT DOCUMENTS

2019/0037509 A1\*  1/2019  Li .................... H04W 56/001
2020/0137796 A1\*  4/2020  Jung .................. H04W 24/08
(Continued)

FOREIGN PATENT DOCUMENTS

WO    WO2019137777    \*  1/2018
WO    WO2020162804    \*  2/2019
WO       2020164439 A1    8/2020

OTHER PUBLICATIONS

APPLE: "Considerations on NR V2X Physical Layer Procedure", 3GPP TSG RAN WG1 #97, 3GPP Draft; R1-1907337 Considerations on NR V2X Physical Layer Procedures, 3rd Generation Partnership Project (3GPP), Mobile Competence Centre; 650, Route Des Lucioles; F-06921 Sophia-Antipolis Cedex, vol. RAN WG1, No. Reno, USA; May 13, 2019-May 17, 2019, pp. 1-6, May 13, 2019 (May 13, 2019), XP051728776, Retrieved from the Internet: URL: http://www.3gpp.org/ftp/ [retrieved on May 13, 2019] the whole document.
(Continued)

*Primary Examiner* — Mohammad S Adhami
(74) *Attorney, Agent, or Firm* — Hayes and Boone LLP

(57) ABSTRACT

Wireless communications systems and methods related to channel occupancy time (COT) sharing among sidelink user equipment devices (UEs) are provided. A first user equipment (UE) determines a channel occupancy time (COT) in a shared radio frequency band for communicating a sidelink with a second UE. The first UE transmits, to the second UE, the sidelink using first resources in the COT, the sidelink comprising COT sharing information for second resources in the COT.

28 Claims, 13 Drawing Sheets

1100

```
Determine channel occupancy time (COT) in shared     ___ 1110
radio frequency band for communicating sidelink
                with second UE
```

```
Transmit, to second UE, the sidelink using first     ___ 1120
resources in COT, sidelink including COT sharing
      information for second resources in COT.
```

(51) Int. Cl.
  *H04W 74/00*  (2009.01)
  *H04W 76/15*  (2018.01)

(56) References Cited

U.S. PATENT DOCUMENTS

| | | | | |
|---|---|---|---|---|
| 2020/0351669 A1* | 11/2020 | Xu | ........................ | H04W 72/048 |
| 2021/0195637 A1* | 6/2021 | Xue | ........................ | H04W 16/14 |
| 2021/0314962 A1* | 10/2021 | Ashraf | .................. | H04W 24/10 |
| 2021/0392684 A1* | 12/2021 | Tiirola | .............. | H04W 72/0453 |
| 2022/0070865 A1* | 3/2022 | Cui | .................... | H04W 74/0808 |
| 2022/0078845 A1* | 3/2022 | Xu | ........................ | H04L 5/0037 |
| 2022/0095117 A1* | 3/2022 | Liu | .................... | H04W 72/0406 |

OTHER PUBLICATIONS

International Search Report and Written Opinion—PCT/US2020/052354—ISA/EPO—dated Nov. 25, 2020.

* cited by examiner

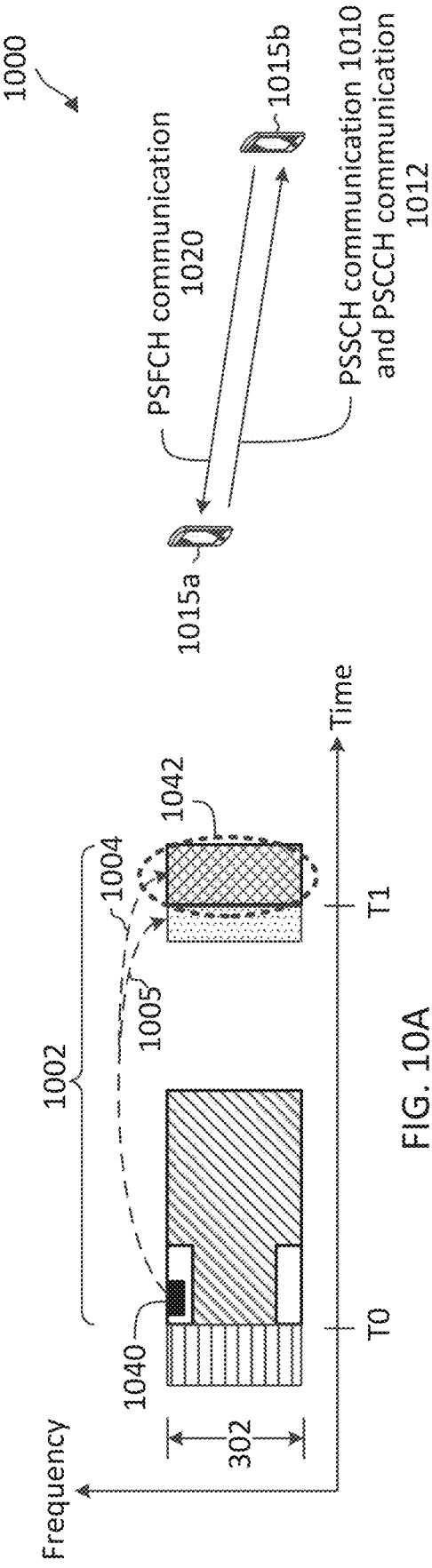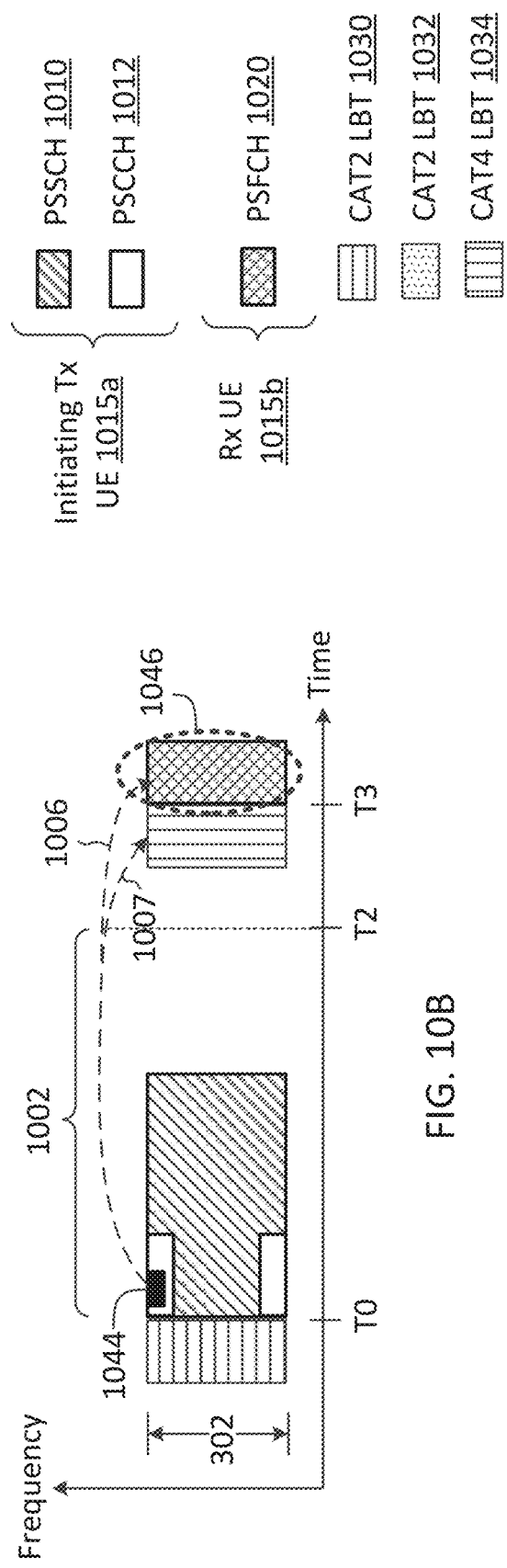
FIG. 10A
FIG. 10B

CHANNEL OCCUPANCY TIME (COT) SHARING FOR SIDELINK

CROSS REFERENCE TO RELATED APPLICATIONS

The present application claims priority to and the benefit of U.S. Provisional Patent Application No. 62/905,962, filed Sep. 25, 2019, which is hereby incorporated by reference in its entirety as if fully set forth below and for all applicable purposes.

TECHNICAL FIELD

This application relates to wireless communication systems, and more particularly to channel occupancy time (COT) sharing among sidelink user equipment devices (UEs).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, including determining, by a first user equipment (UE), a channel occupancy time (COT) in a shared radio frequency band for communicating a sidelink with a second UE; and transmitting, by the first UE to the second UE, the sidelink using first resources in the COT, the sidelink including COT sharing information for second resources in the COT.

In an additional aspect of the disclosure, a method of wireless communication, including monitoring, by a first user equipment (UE), for sidelink channel occupancy time (COT) sharing information in a shared radio frequency band; receiving, by the first UE from a second UE, the sidelink COT sharing information associated with a COT based on the monitoring; and transmitting, by the first UE to a third UE different from the second UE, a sidelink in the shared radio frequency band during the COT based on the COT sharing information.

In an additional aspect of the disclosure, a first user equipment (UE) including a processor configured to determine a channel occupancy time (COT) in a shared radio frequency band for communicating sidelink with a second UE; and a transceiver configured to transmit, to the second UE, the sidelink using first resources in the COT, the sidelink including COT sharing information for second resources in the COT.

In an additional aspect of the disclosure, a first user equipment (UE) including a processor configured to monitor for sidelink channel occupancy time (COT) sharing information in a shared radio frequency band; and a transceiver configured to receive, from a second UE, the sidelink COT sharing information associated with a COT based on the monitoring; and transmit, to a third UE different from the second UE, a sidelink in the shared radio frequency band during the COT based on the COT sharing information.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 10A illustrates a sidelink communication scheme according to some aspects of the present disclosure.

FIG. 10B illustrates a sidelink communication scheme according to some aspects of the present disclosure.

DETAILED DESCRIPTION

Figure 1:
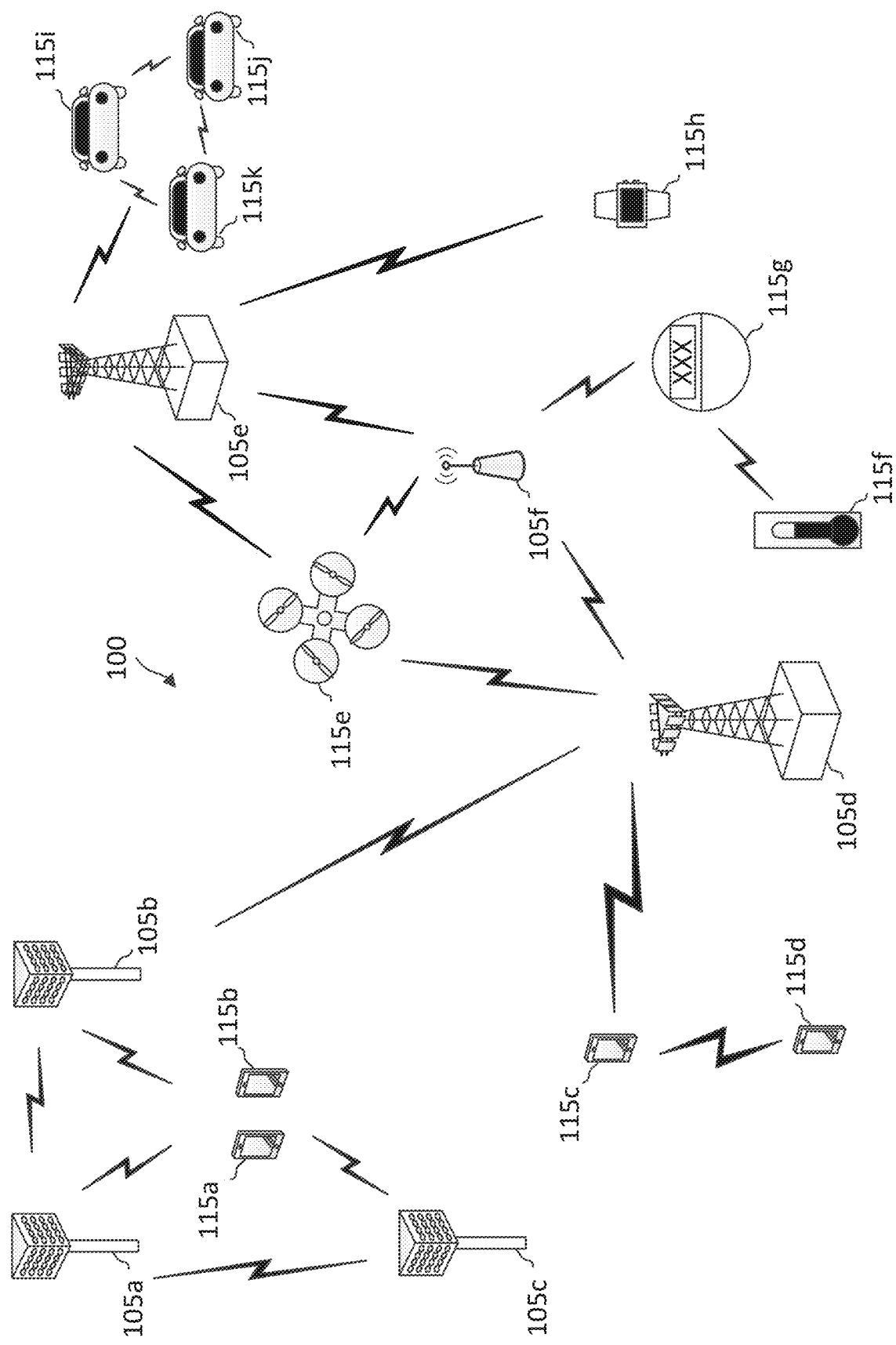
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR technologies had been extended to operate over an unlicensed spectrum. The deployment of NR technologies over an unlicensed spectrum is referred to as NR-U. NR-U is targeted for operations over the 5 gigahertz (GHz) and 6 GHz bands, where there are well-defined channel access rules for sharing among operators of the same radio access technology (RAT) and/or of different RATs. When a BS operates over an unlicensed spectrum, the BS does not have ownership of the spectrum or control over the spectrum. Thus, the BS is required to contend for channel access in the spectrum, for example, via clear channel assessment (CCA) and/or listen-before-talk (LBT) procedures.

The provisioning of sidelink services, such as device-to-device (D2D), vehicle-to-vehicle (V2V), vehicle-to-everything (V2X), and/or cellular vehicle-to-everything (C-V2X) communications, over dedicated spectrum or licensed spectrum are relatively straight-forward as channel access in the dedicated spectrum or licensed spectrum is guaranteed. NR-U can bring benefit for sidelink services, for example, by offloading sidelink traffic to the unlicensed spectrum at no cost. However, channel access in a shared spectrum or an unlicensed spectrum is not guaranteed. Thus, to provision for sidelink services over a shared spectrum or unlicensed spectrum, sidelink user equipment devices (UEs) are required to contend for channel access in the spectrum, for example, via CCA and/or LBT procedures.

The present application describes mechanisms for sharing sidelink channel occupancy time (COT) for sidelink communications in a shared radio frequency band among sidelink UEs. For example, a first UE may contend for a COT in the shared radio frequency band for sidelink communication by performing a listen-before-talk (LBT) (e.g., a category 4 (CAT4) LBT) in the shared radio frequency band to acquire to a COT in the shared radio frequency band. After winning the contention, the first UE may transmit a sidelink data via a physical sidelink shared channel (PSSCH) and/or sidelink control information (SCI) via a physical sidelink control channel (PSCCH) to a second UE. The shared radio frequency band may be partitioned into a plurality of frequency interlaces of resource blocks (RBs). The sidelink communication can be transmitted using one or more frequency interlaces of the plurality of frequency interlaces.

In some aspects, the sidelink communication may not require all the frequency interlaces in the shared radio frequency band and/or the entire duration of the COT. Thus, the first UE may allow another sidelink UE to opportunistically join the COT and utilize any unoccupied frequency interlaces and/or unoccupied time resources. To facilitate COT sharing, the first UE may include COT sharing information in the SCI. For instance, for interlace-based sharing, the COT sharing information may include information associated with available or unoccupied frequency interlaces in the COT, a duration of the COT, an end time of the COT, gap periods within the COT for a responding sidelink UE to perform an LBT prior to joining the COT, and/or a priority (e.g., a channel access priority class (CAPC)) used for acquiring the COT. For time domain-based sharing, the COT sharing information may include timing information associated with unoccupied time resources and/or a contention slot timing grid for contending for the unoccupied time resources, a CAPC used for acquiring the COT.

In some aspects, the first UE may apply hybrid automatic repeat request (HARQ) techniques for sidelink data communication and may include in a scheduling SCI indicating an LBT type to be used by a receiving sidelink UE to transmitting a HARQ acknowledgement/negative-acknowledgement (ACK/NACK) for the sidelink data communication.

Aspects of the present disclosure can provide several benefits. For example, the inclusion of the COT sharing information in the SCI can allow other sidelink UEs to opportunistically utilize unoccupied time-domain and/or frequency-domain resources in the COT. Thus, the disclosed embodiments can improve spectrum utilization efficiency.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel A TXOP may also be referred to as channel occupancy time (COT).

In some aspects, the network 100 may provision for sidelink communications to allow a UE 115 to communicate with another UE 115 without tunneling through a BS 105 and/or the core network. The BS 105 may configure certain resources in a licensed band and/or an unlicensed band for sidelink communications between the UE 115 and the other UE 115. Certain frequency bands may have certain BW occupancy requirements and/or a maximum allowable power spectral density (PSD). To meet BW occupancy requirements and/or boost transmit power under certain PSD limitations, sidelink transmissions in the network 100 may use a frequency-interlaced waveform. For example, an unlicensed band may be partitioned into a plurality of frequency interlaces and sidelink communications can be transmitted over one or more frequency interlaces. To communicate sidelink communications over an unlicensed band, a UE 115 may contend for a COT in the unlicensed band by perform an LBT. If the LBT passes indicating that the UE 115 won the contention, the UE 115 may communicate sidelink communication with another UE 115 in the unlicensed band during the COT. In some instances, the sidelink communication may have a small data size, and thus may not require all frequency interlaces in the unlicensed band and/or the entire COT duration. Accordingly, other UEs 115 may opportunistically join the COT and utilize any remaining frequency interlaces and/or COT duration. Mechanisms for sidelink COT sharing are described in greater detail herein.

Figure 2:
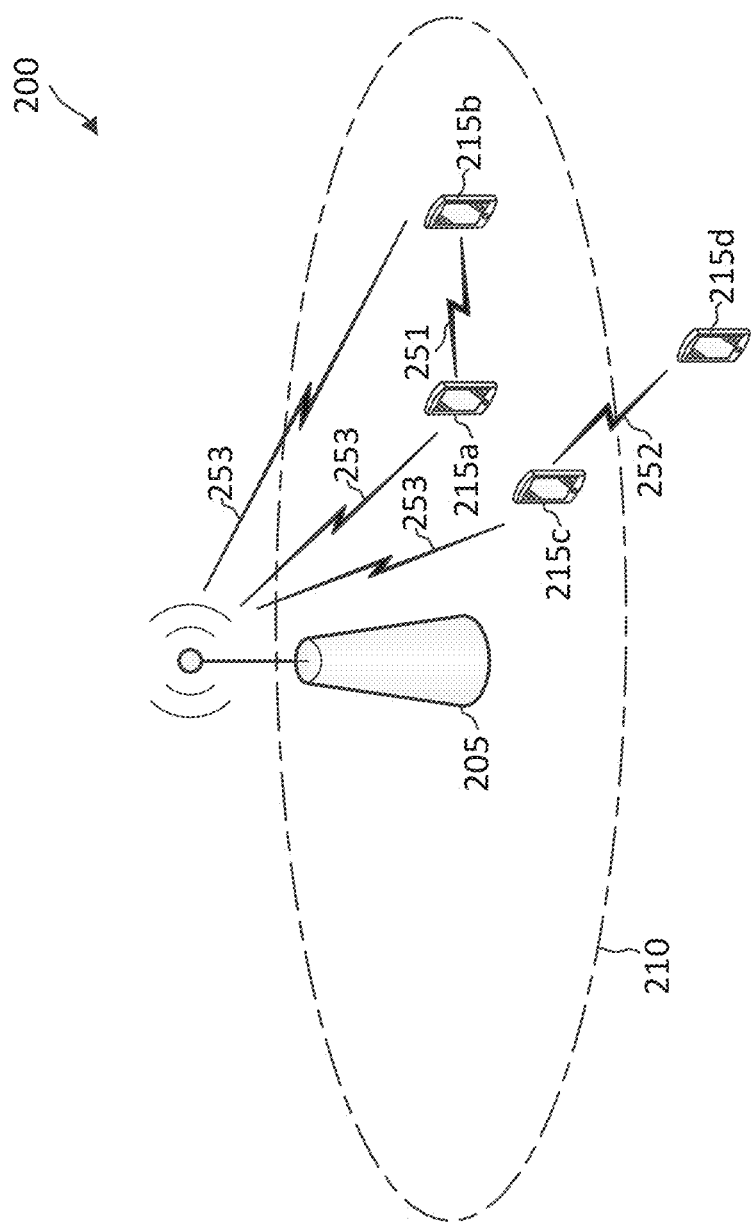
FIG. 2 illustrates a wireless communication network that provisions for sidelink communications according to some aspects of the present disclosure.

FIG. 2 illustrates an example of a wireless communication network 200 that provisions for sidelink communications according to embodiments of the present disclosure. The network 200 may be similar to the network 100. FIG. 2 illustrates one BSs 205 and four UEs 215 for purposes of simplicity of discussion, though it will be recognized that embodiments of the present disclosure may scale to any suitable number of UEs 215 and/or BSs 205 (e.g., the about 2, 3, 6, 7, 8, or more). The BS 205 and the UEs 215 may be similar to the BSs 105 and the UEs 115, respectively. The BSs 205 and the UEs 215 may communicate over the same spectrum.

In the network 200, some of the UEs 215 may communicate with each other in peer-to-peer communications. For example, the UE 215a may communicate with the UE 215b over a sidelink 251, and the UE 215c may communicate with the UE 215d over another sidelink 252. In some instances, the sidelinks 251 and 252 are unicast bidirectional links, each between a pari of UEs 215. In some other instances, the sidelinks 251 and 252 can be multicast links supporting multicast sidelink services among the UEs 215. For instance, the UE 215c may transmit multicast data to the UE 215d and the UE 215b over sidelinks. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d is outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications. C-V2X communications may refer to communications between vehicles and any other wireless communication devices in a cellular network.

In some aspects, the network 200 may be a LTE network. The transmissions by the UE 215a and the UE 215b over the sidelink 251 and/or the transmissions by the UE 215c and the UE 215d over the sidelink 252 may reuse a LTE PUSCH waveform, which is a discrete Fourier transform-spreading (DFT-s) based waveform. In some aspects, the network 200 may be an NR network. The transmissions by the UEs 215 over the sidelinks 251 and/or 252 may use a cyclic-prefix-OFDM (CP-OFDM) waveform. In some aspects, the network 200 may operate over a shared radio frequency band (e.g., an unlicensed band). The transmissions by the UEs 215 over the sidelinks 251 and/or 252 may use a frequency interlaced waveform.

Figure 3A:
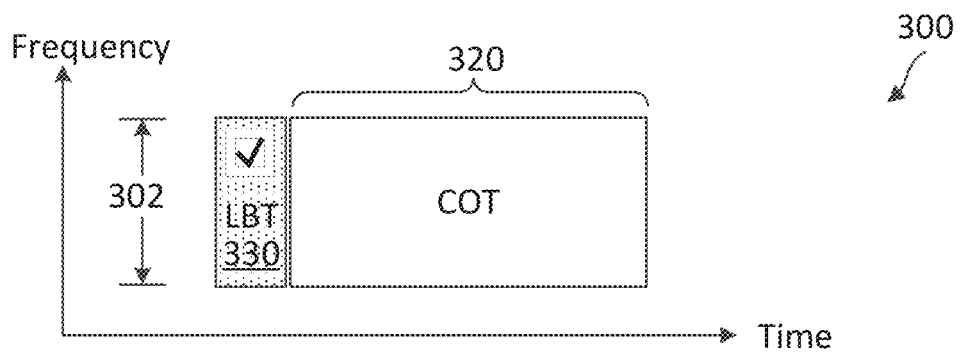
FIG. 3A illustrates a sidelink communication scheme according to some aspects of the present disclosure.
Figure 3B:
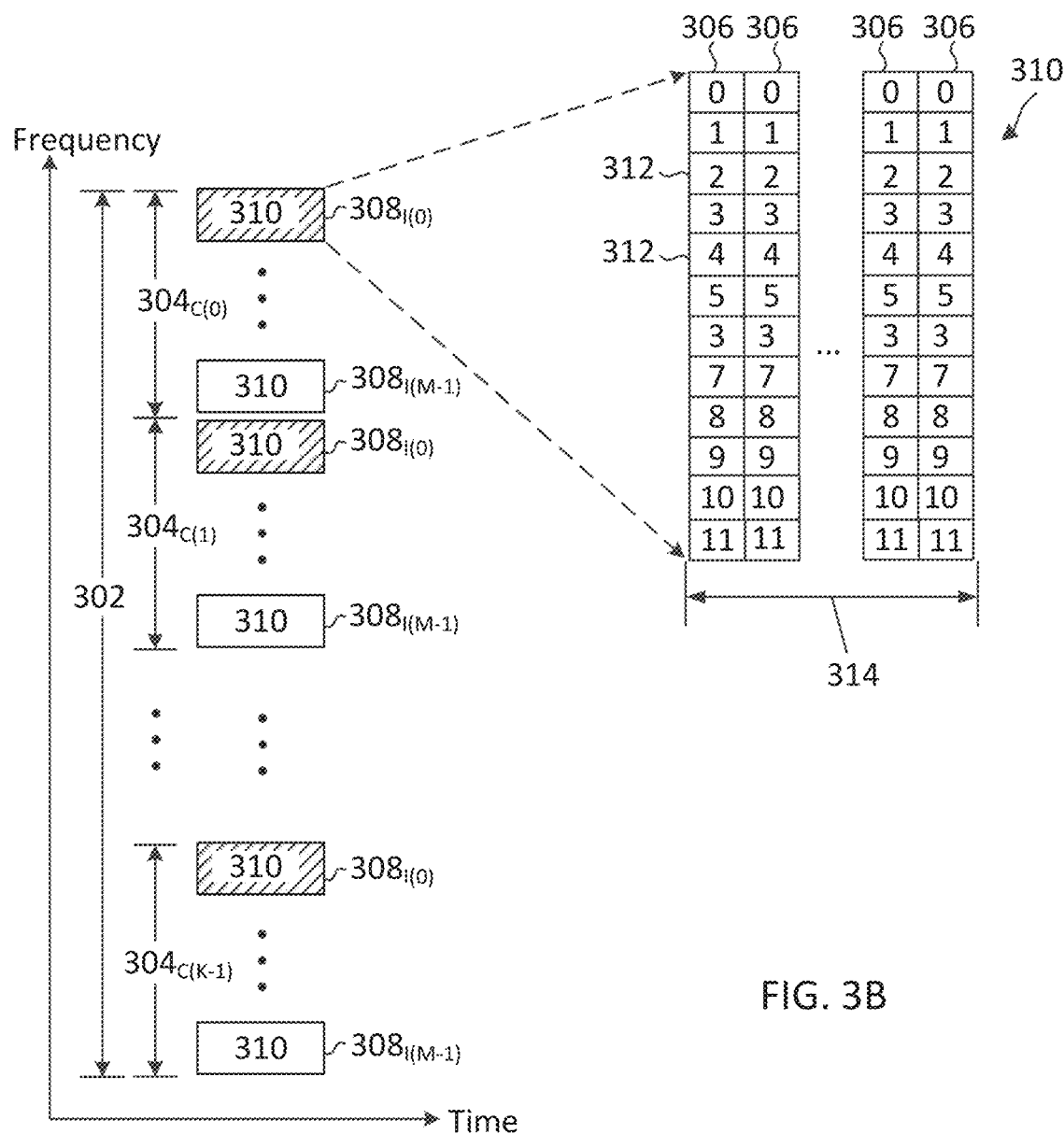
FIG. 3B illustrates a sidelink communication scheme according to some aspects of the present disclosure.

FIGS. 3A-3B collectively illustrate a sidelink communication scheme 300 according to some aspects of the present disclosure. The scheme 300 may be employed by UEs such as the UEs 115 and 215 in a network such as the networks 100 and/or 200. In particular, the UEs may communicate with each other over a sidelink such as the sidelinks 251 and 252 as shown in the scheme 300. In FIGS. 3A and 3B, the x-axes represent time in some arbitrary units, and the y-axes represent frequency in some arbitrary units. In the scheme 300, a UE (e.g., the UEs 115 and/or 215) may contend for a COT in a shared radio frequency band or an unlicensed band for sidelink communication with another UE (e.g., the UEs 115 and/or 215) over a sidelink (e.g., the sidelinks 251 and 252) and may communicate the sidelink communication using a frequency interlaced waveform.

FIG. 3A shows a shared radio frequency band 302. The frequency band 302 may be a shared radio frequency band or an unlicensed band shared by a plurality of network operating entities. The frequency band 302 may, for example, have a BW of about 10 megahertz (MHz) or about 20 MHz and a subcarrier spacing (SCS) of about 15 kilohertz (kHz), about 30 kHz, or about 20 kHz. The frequency band 302 may be located at any suitable frequencies. In some aspects, the frequency band 302 may be located at about 3.5 GHz, 6 GHz, or 30 GHz. To communicate sidelink communication over the frequency band 302, the UE A may perform an LBT 330 to contend for a COT 320 in the frequency band 302. The LBT 330 may be a category 4 (CAT4) LBT. A CAT4 LBT refers to an LBT with a random backoff and a variable contention window. If the LBT 330 fails, the UE A may refrain from transmitting in the frequency band 302. However, if the LBT 330 is successful, the UE A may proceed to use the COT 320 for sidelink communication. In the illustrated example of FIG. 3A, the LBT 330 is successful as shown by the checkmark. Thus, the UE A may communicate sidelink communication with the UE B in the frequency band 302 during the COT 320. To meet a BW occupancy requirement and/or a PSD requirement in the frequency band 302, the UE A may transmit the sidelink communication using a frequency interlaced waveform as shown in FIG. 3B.

FIG. 3B provides a more detailed view of the resource structure in the COT 320. As show, the frequency band 302 is partitioned into a plurality of frequency interlaces 308 shown as $308_{I(0)}$ to $308_{(M-1)}$, where M is a positive integer. Each frequency interlace $308_{I(i)}$ may include K plurality of RBs 310 evenly spaced over the frequency band 302, where K is a positive integer and i may vary between 0 to M−1. In other words, the RBs 310 in a particular frequency interlace $308_{I(i)}$ are spaced apart from each other by at least one other RB 310. The frequency interlace $308_{I(0)}$ as shown by the pattern filled boxes comprises RBs 310 from clusters $304_{C(0)}$ to $304_{C(K-1)}$. The values of K and M may vary based on several factors, such as the bandwidth, the SCS, and/or the PSD limitation of the frequency band 302, as described in greater detail below.

A group of M localized RBs 310 forms a cluster 304. As shown, the frequency interlaces $308_{I(0)}$ to $308_{(M-1)}$ form K clusters $304_{C(0)}$ to $304_{C(K-1)}$. Each RB 310 may span about twelve contiguous subcarriers 312 in frequency and a time period 314. The subcarriers 312 are indexed from 0 to 11. The subcarriers 312 are also referred to as resource elements (REs). The time period 314 may span any suitable number of OFDM symbols 306. In some aspects, the time period 314 may correspond to one transmission time interval (TTI), which may include about fourteen OFDM symbols 306.

The number of clusters 304 or the value of K may be dependent on the amount of frequency distribution required to maintain a certain BW occupancy. As an example, the scheme 300 may divide the frequency band 302 into about ten clusters 304 (e.g., K=10) and distribute an allocation over the ten clusters 304 to increase a frequency occupancy of the allocation. In an aspect, the frequency band 302 may have a bandwidth of about 20 MHz and each subcarrier 312 may span about 15 kHz in frequency. In such an aspect, the frequency band 302 may include about ten frequency interlaces 308 (e.g., M=10). For example, an allocation may include one frequency interlace 308 having ten distributed or equally spaced RBs 310. Compared to an allocation with a single RB or ten localized RBs, the interlaced allocation with the ten distributed RBs 310 allows a UE to transmit with a higher BW occupancy.

In another aspect, the frequency band 302 may have a bandwidth of about 10 MHz and each subcarrier 312 may span about 15 kHz in frequency. In such an aspect, the frequency band 302 may include about five frequency interlaces 308 (e.g., M=5). Similarly, an allocation may include one frequency interlace 308 having ten distributed RBs 310. The interlaced allocation with the ten distributed RBs may allow for a wider BW occupancy than an allocation with a single RB or ten localized RBs.

In another aspect, the frequency band 302 may have a bandwidth of about 20 MHz and each subcarrier 312 may span about 30 kHz in frequency. In such an aspect, the frequency band 302 may include about five frequency interlaces 308 (e.g., M=5). Similarly, an allocation may include one frequency interlace 308 having ten distributed RBs 310. The interlaced allocation with the ten distributed RBs may allow for a wider BW occupancy than an allocation with a single RB or ten localized RBs.

In some aspects, the RBs 310 are physical resource blocks (PRBs) and each frequency interlace 308 may include PRBs uniformly spaced in the frequency band 302.

In the scheme 300, the UE A may select one or more frequency interlaces 308 for sidelink communication with the UE B in the COT 320. As an example, the UE A selects the frequency interlace $308_{I(0)}$ shown by the patterned boxes for sidelink communication with the UE B in the COT 320. In some other examples, the UE A may select a different frequency interlace $308_{I(m)}$, where m may be between 1 and M−1, for the sidelink communication. Additionally, the UE A may use any suitable number of frequency interlaces 308 for the sidelink communication, for example, between 1 to M number of frequency interlaces 308.

The sidelink communication over the frequency interlace $308_{I(0)}$) may include sidelink data and SCI. The sidelink data may be communicated via a PSSCH. The SCI may be communicated via a PSCCH. The SCI may carry information or parameters related to the transmission of the PSSCH. In some aspects, the PSCCH may be mapped to a lowest-frequency RB 310 and highest-frequency RB 310 of the frequency interlace $308_{I(0)}$ for frequency diversity, and the PSSCH may be carried by remaining RBs 310 of the frequency interlace $308_{I(0)}$. In other words, the PSCCH can be mapped to the RBs 310 of the frequency interlace $308_{I(0)}$ that are within the clusters $304_{C(0)}$ and $304_{C(K-1)}$, and the PSSCH can be mapped to the RBs 310 of the frequency interlace $308_{I(0)}$ that are within the clusters $304_{C(1)}$ to $304_{C(K-2)}$.

While FIG. 3B illustrates the frequency interlaces 308 spanning one slot or one RB 310 duration (e.g., the time period 314), the frequency interlaces 308 can span a longer duration, for example, 2, 3, or more slots or any suitable number of symbol 306 durations. Since an LBT (e.g., the LBT 330) is required for each transmission burst in the frequency band 302 and each LBT may have a certain delay or overhead, a UE may take full advantage of the channel access after winning a COT (e.g., the COT 320). For example, the UE may schedule multiple sidelink communications (e.g., over multiple contiguous transmission time intervals (TTIs)) in a duration of the COT without performing additional LBTs between the sidelink communications. Each sidelink communication in the COT may be communicated with the same UE or a different UE. Each sidelink communication may include one TB transmitted in a TTI using one or more frequency interlaces 308. However, the UE may not require all frequency interlaces 308 in the frequency band 302 for each sidelink communication. Thus, there may be unused frequency interlaces 308 or frequency domain resources in the COT. Additionally or alternatively, the UE may have acquired a COT with a duration longer that what is required for the sidelink communication. Thus, there may be unused time domain resources in the COT.

Accordingly, the present disclosure provides techniques for UEs to share sidelink COT resources. For example, a sidelink UE initiating a COT may indicate information about unused or available time and/or frequency domain resources in the COT that may be shared with other sidelink UEs. A monitoring sidelink UE may monitor for the COT sharing information and opportunistically join the COT and utilize the unused or available resources in the COT based on detected COT sharing information.

Figure 4:
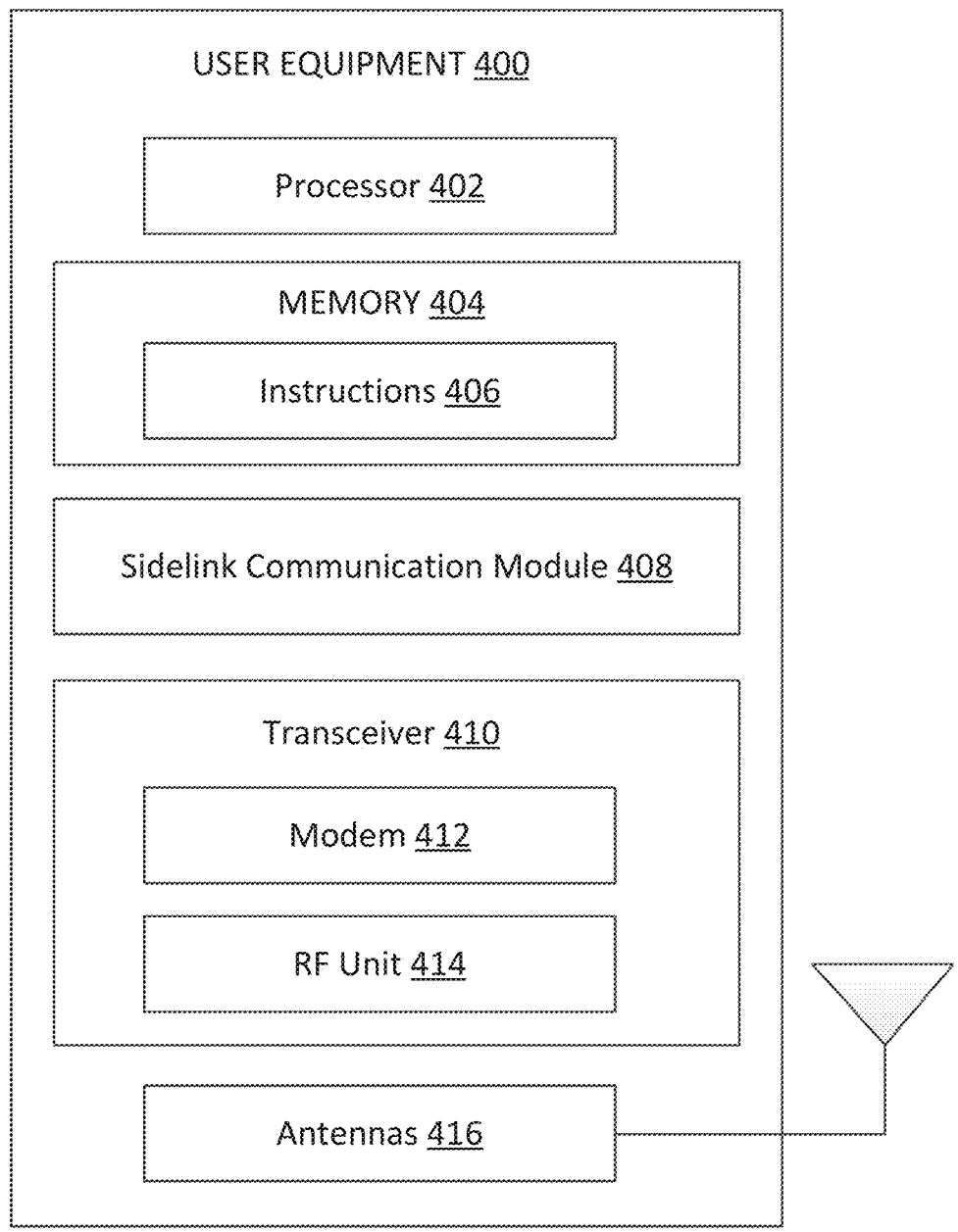
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1. As shown, the UE 400 may include a processor 402, a memory 404, an sidelink communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 6-13. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink communication module 408 may be implemented via hardware, software, or combinations thereof. For example, the sidelink communication module 408 may be implemented as a processor, circuit, and/or instructions 406 stored in the memory 404 and executed by the processor 402. In some instances, the sidelink communication module 408 can be integrated within the modem subsystem 412. For example, the sidelink communication module 408 can be implemented by a combination of software components (e.g., executed by a DSP or a general processor) and hardware components (e.g., logic gates and circuitry) within the modem subsystem 412.

The sidelink communication module 408 may be used for various aspects of the present disclosure, for example, aspects of FIGS. 6-13. The sidelink communication module 408 is configured to contend for a COT in a shared radio frequency band for sidelink communication with another UE (e.g., the UEs 115 and/or 215) by performing an LBT and/or transmit the sidelink communication (e.g., including PSSCH and PSCCH communications) in the COT upon winning the COT. The shared radio frequency band may be partitioned into a plurality of frequency interlaces of RBs. In some aspects, the sidelink communication module 408 is configured to select one or more frequency interlaces from the plurality of frequency interlaces to transmit the sidelink communication during the COT. In some aspects, the sidelink communication module 408 is configured to include COT sharing SCI in the PSSCH communication to enable another sidelink UE to opportunistically join the COT and utilize any time and/or frequency resource not occupied by the UE 400's sidelink communication. For instance, for interlace-based sharing, the COT sharing information may include information associated with available or unoccupied frequency interlaces in the COT, a duration of the COT, an end time of the COT, gap periods within the COT for a responding sidelink UE to perform an LBT prior to joining the COT, and/or a CAPC used for acquiring the COT. For time domain-based sharing, the COT sharing information may include timing information associated with unoccupied time resources and/or a contention slot timing grid for contending for the unoccupied time resources, a CAPC used for acquiring the COT.

In some aspects, the sidelink communication module 408 is configured to transmit a sidelink resource configuration request, a sidelink resource request, and/or a sidelink COT sharing request to a BS (e.g., the BSs 105 and 215) and/or receive a sidelink resource configuration from the BS. The sidelink resource configuration may indicate a time, a periodicity, and/or a frequency band where the UE 400 may contend for COTs for sidelink communication (e.g., PSSCH/PSCCH/PSFCH). The sidelink resource configuration may indicate whether the sidelink UE 400 is allowed to share a sidelink COT with another sidelink UE. The sidelink resource configuration may indicate the rules for the UE 400 to share a sidelink COT. For instance, the rules may indicate sidelink COT sharing may be based on frequency interlaced based sharing and/or time domain base sharing. The rules may also indicate rules for the UE 400 to propagate sidelink COT sharing information received from another UE and/or and respond to sidelink COT sharing information propagated by another UE. Mechanisms for sidelink COT sharing are described in greater detail herein.

In some aspects, the sidelink communication module 408 is configured to apply HARQ techniques to sidelink data communication, transmit a scheduling SCI including an indication of an LBT type and/or a resource to be used by a receiving sidelink UE to transmitting a HARQ ACK/NACK for the sidelink data communication. In some aspects, the sidelink communication module 408 is configured to receive a sidelink data communication associated with a HARQ process from another UE (e.g., the UEs 115, 215, and/or 400), receive a scheduling SCI including an indication of an LBT type and/or a resource to be used by the UE 400 to transmit a HARQ ACK/NACK for the sidelink data communication. Mechanisms for sidelink communication with HARQ are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the sidelink communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PSSCH data and/or PSCCH control information, COT sharing SCI, HARQ ACK/NACK) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., PSSCH data and/or PSCCH control information, COT sharing SCI, HARQ ACK/NACK) to the sidelink communication module 408 for processing. The antennas 416 may include multiple antennas of similar or different designs in order to sustain multiple transmission links. The RF unit 414 may configure the antennas 416.

In an example, the transceiver 410 is configured to transmit PSSCH data, PSCCH SCI, sidelink COT sharing SCI, sidelink scheduling SCI, and/or physical sidelink feedback channel (PSFCH) ACK/NACK feedbacks to another UE and/or receive PSSCH data, PSCCH SCI, sidelink COT sharing SCI, sidelink scheduling SCI, and/or PSFCH ACK/NACK feedbacks from another UE, for example, by coordinating with the sidelink communication module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
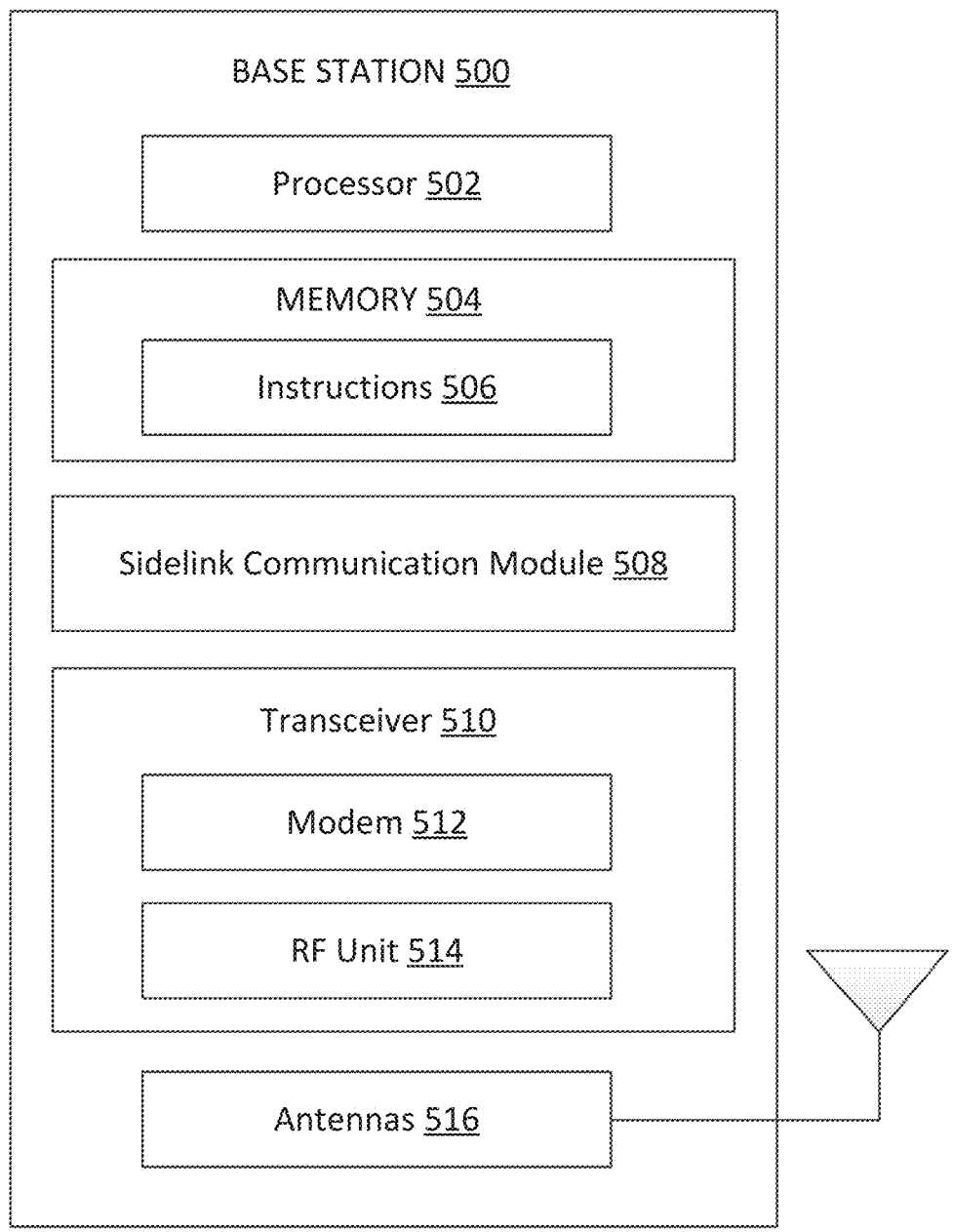
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1. A shown, the BS 500 may include a processor 502, a memory 504, an sidelink communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-10. Instructions 506 may also be referred to as code, which may be interpreted broadly to include any type of computer-readable statement(s) as discussed above with respect to FIG. 4.

The sidelink communication module 508 may be implemented via hardware, software, or combinations thereof. For example, the sidelink communication module 508 may be implemented as a processor, circuit, and/or instructions 506 stored in the memory 504 and executed by the processor 502. In some instances, the sidelink communication module 508 can be integrated within the modem subsystem 512. For example, the sidelink communication module 508 can be implemented by a combination of software components (e.g., executed by a DSP or a general processor) and hardware components (e.g., logic gates and circuitry) within the modem subsystem 512.

The sidelink communication module 508 may be used for various aspects of the present disclosure, for example, aspects of FIGS. 6-10. The sidelink communication module 508 is configured to configured to configure a pool of sidelink resources for sidelink UEs (e.g., the UEs 115, 215, and/or 400) for sidelink communications (e.g., PSSCH, PSCCH) and/or a pool of sidelink ACK/NACK resources for PSFCH communications, determine whether COT sharing is allowed among sidelink UEs, determine rules for COT sharing among sidelink UEs, and/or transmit a sidelink resource configuration to the sidelink UEs. The sidelink resource configuration may indicate a time, a periodicity, and/or a frequency band where the sidelink UEs may contend for COTs for sidelink communication (e.g., PSSCH/PSCCH/PSFCH). The sidelink resource configuration may indicate whether a sidelink UE is allowed to share a sidelink COT with another sidelink UE. The sidelink resource configuration may indicate the rules for the sidelink UEs to share a sidelink COT. For instance, the rules may indicate sidelink COT sharing may be based on frequency interlaced based sharing and/or time domain base sharing. The rules may also indicate rules for the sidelink UE to propagate sidelink COT sharing information received from another UE and/or respond to propagated sidelink COT sharing information. In some aspects, the sidelink communication module 508 is configured to receive a sidelink resource request and/or a sidelink COT sharing request from the sidelink UE and the sidelink resource configuration may be transmitted in response to the request.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., a sidelink resource configuration, sidelink COT sharing configuration) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., a sidelink resource configuration request, a sidelink COT sharing request) to the sidelink communication module 508 for processing. The antennas 516 may include multiple antennas of similar or different designs in order to sustain multiple transmission links.

In an example, the transceiver 510 is configured to transmit a resource configuration to a UE (e.g., the UEs 115 and 400) indicating a frequency interlace and receive a UL control channel signal (e.g., a PUCCH signal) modulated by HARQ ACK/NACK and SR from the UE in the frequency interlace, for example, by coordinating with the sidelink communication module 508.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
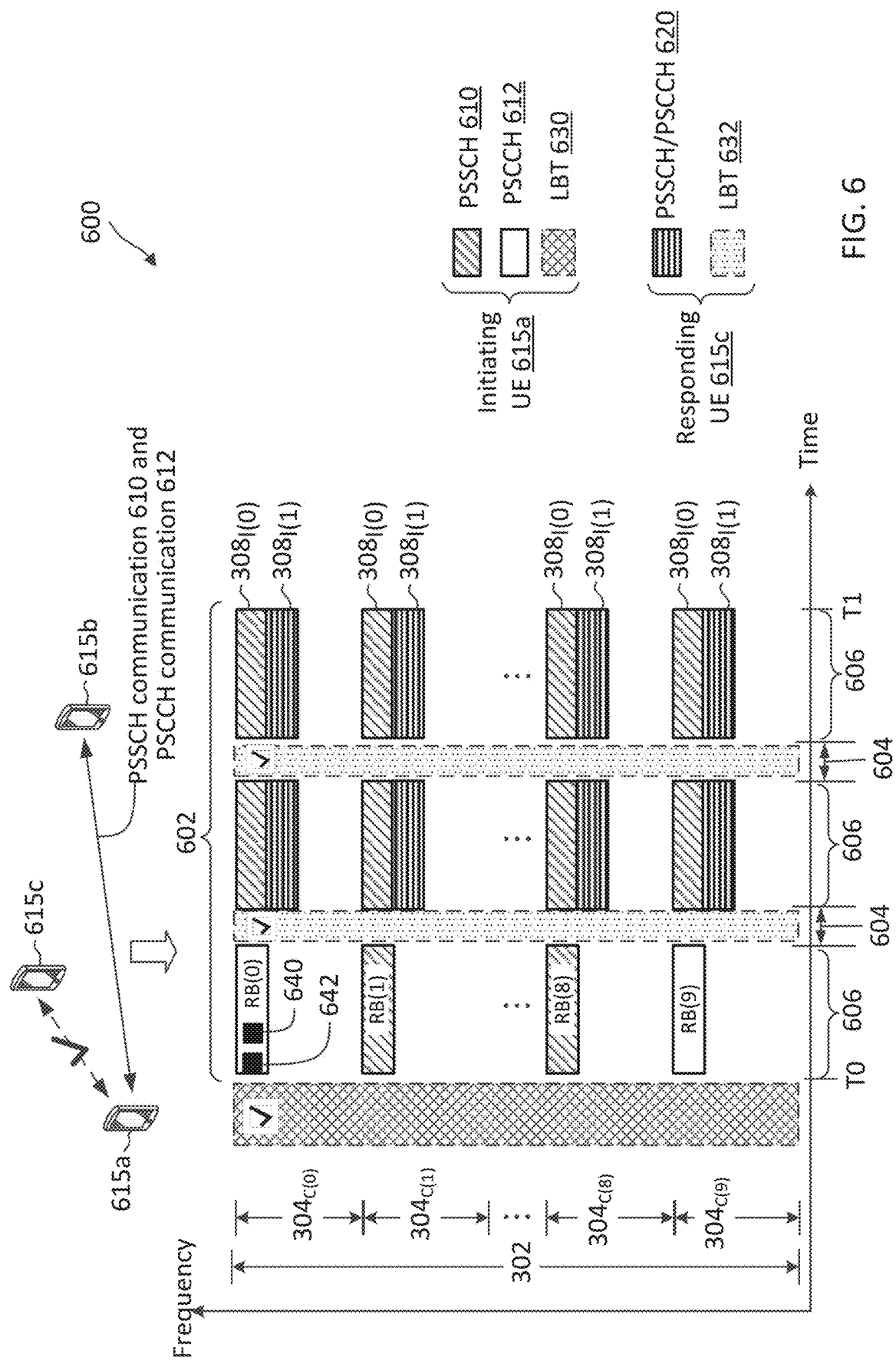
FIG. 6 illustrates a sidelink channel occupancy time (COT) sharing scheme according to some aspects of the present disclosure.
Figure 7:
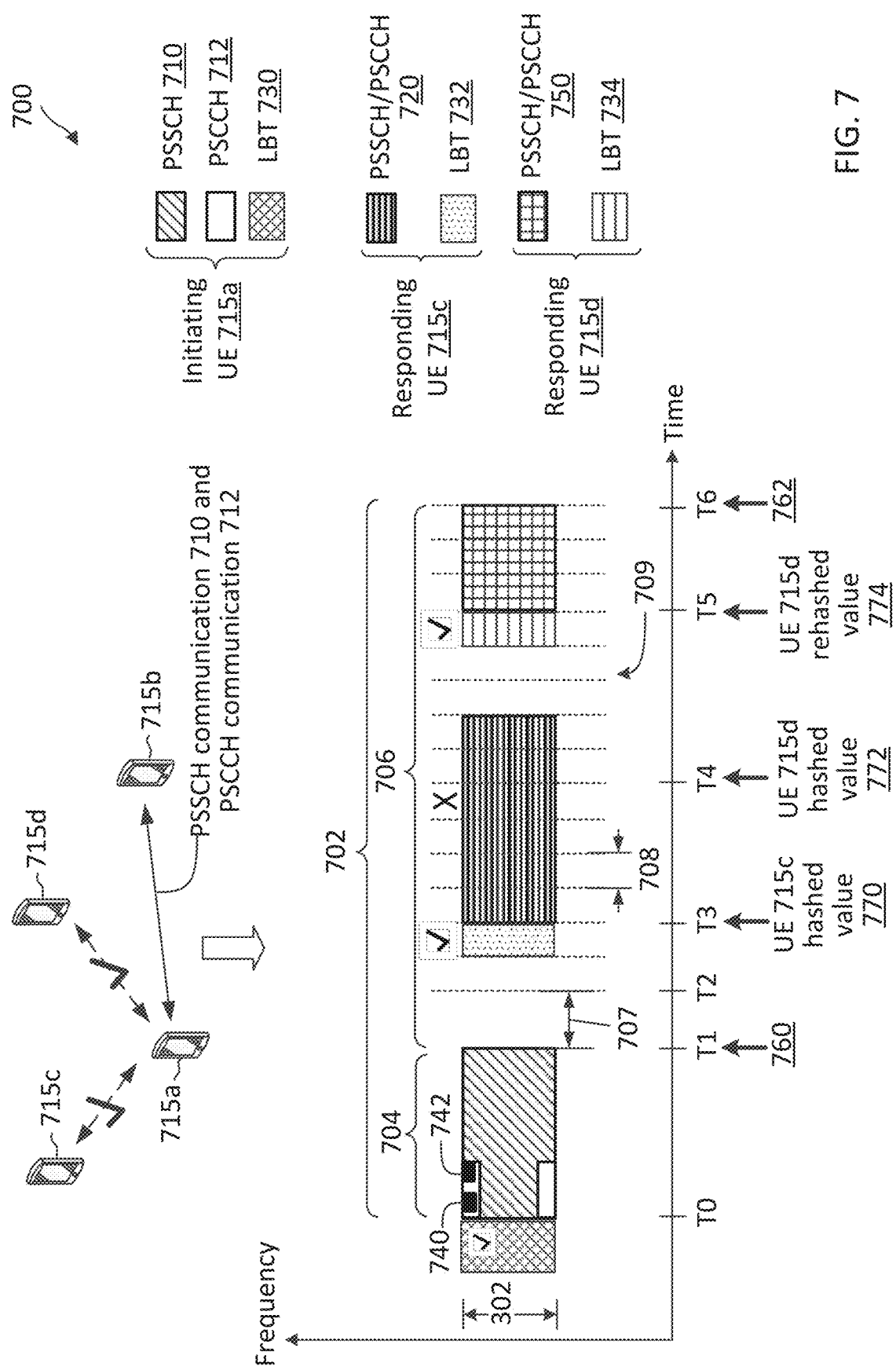
FIG. 7 illustrates a sidelink COT sharing scheme according to some aspects of the present disclosure.
Figure 8:
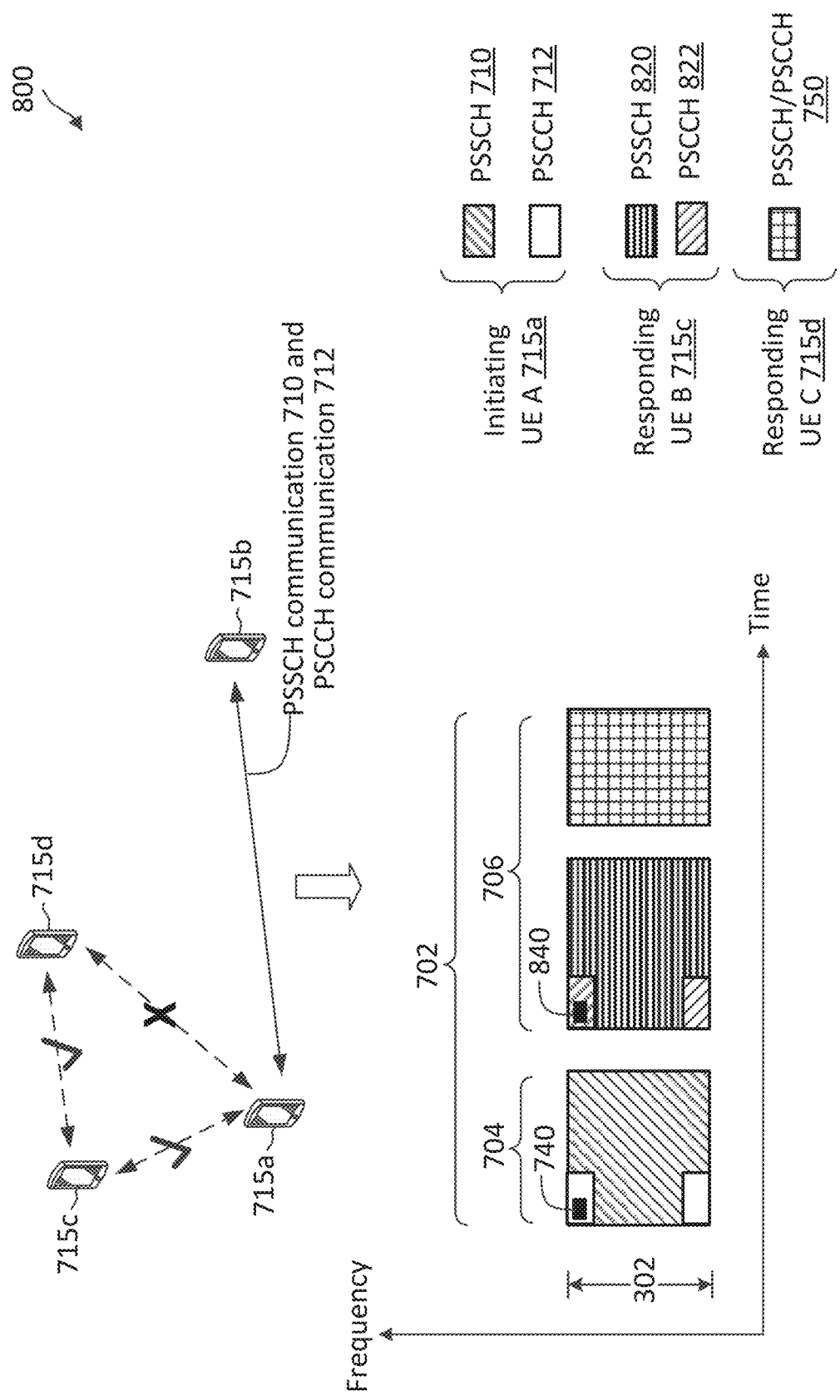
FIG. 8 illustrates a sidelink COT sharing scheme according to some aspects of the present disclosure.
Figure 9:
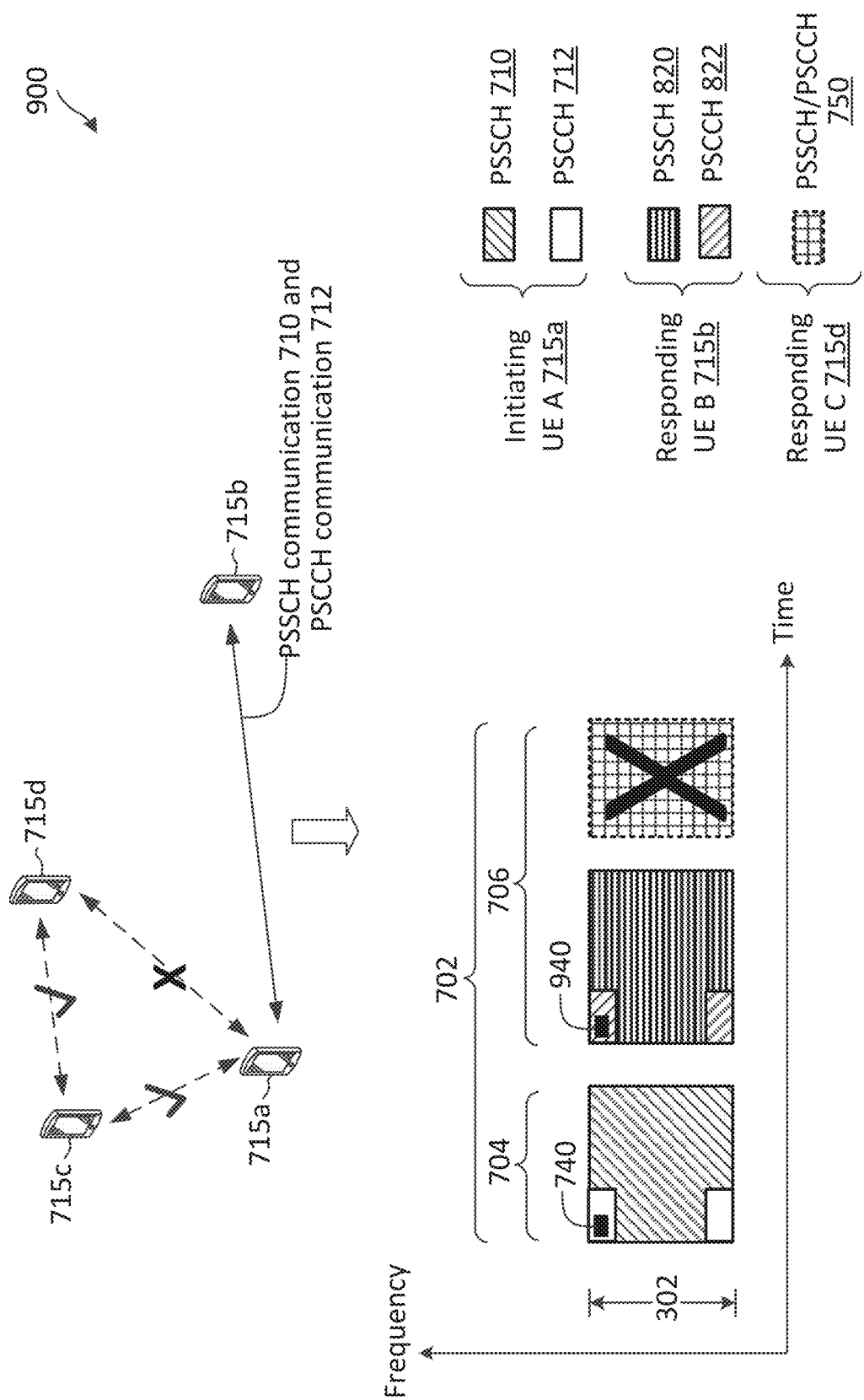
FIG. 9 illustrates a sidelink COT sharing scheme according to some aspects of the present disclosure.

FIGS. 6-9 illustrate various mechanisms for a sidelink UE (e.g., the UEs 115, 215, and/or 400) to share a COT acquired by the sidelink UE with another sidelink UE for sidelink communication. In FIGS. 6 and 9, the schemes 600, 700, 800, and/or 900 may be employed by a UE such as the UEs 115, 215, and/or 400 in a network such as the networks 100 and/or 200. In particular, the UE may acquire a COT and provide COT sharing information to allow other UEs to join the COT and/or or monitor for COT sharing information from another sidelink UE and join the other UE's COT as shown in the schemes 600, 700, 800, and/or 900.

FIG. 6 illustrates a sidelink COT sharing scheme 600 according to some aspects of the present disclosure. The scheme 600 provisions for COT sharing among sidelink UEs (e.g., the UEs 115, 215, and/or 400) using frequency interlace-based sharing. The scheme 600 is described using a similar frequency-interlaced resource structure as in the scheme 300, and may use the same reference numerals as in FIG. 3 for simplicity sake. For purposes of simplicity of discussion, FIG. illustrates an example for a 10 MHz BW (e.g., the frequency band 302) with 15 kHz SCS and ten clusters 304 (e.g., K=10). Thus, each frequency interlace $308_{I(m)}$ in a COT may include ten RBs (e.g., the RBs 310), where m may vary between 0 to M−1. However, the scheme 600 may be applied to a COT including any suitable number of RBs 310 and/or any SCS (e.g., 30 kHz, 60 kHz or more). The RBs in the frequency interlace $308_{I(0)}$ are shown as RB(0) to RB(9).

In the scheme 600, a UE 615a (e.g., the UEs 115, 215, and/or 400) may initiate or contend for a COT 602 in the frequency band 302 by performing an LBT 630 in the frequency band 302. The LBT 630 may be a CAT4 LBT similar to the LBT 330. The LBT 630 is a pass as shown by the checkmark indicating that the UE 615a won the COT 602. After winning the COT 602, the UE 615a may transmit a sidelink communication to a UE 615b. The UE 615a may select a frequency interlace 308 from the frequency band 302 for the sidelink communication. In the illustrated example of FIG. 6, the UE 615a selects the frequency interlace $308_{I(0)}$) for the sidelink communication. In some other instances, the UE 615a may select another frequency interlace $308_{I(m)}$, where m may be between 1 and 9. The sidelink communication may include PSSCH communication 610 and PSCCH communication 612. The PSSCH communication 610 may include sidelink data. The PSCCH communication 612 may include SCI 642 related to the transmission or scheduling of the sidelink data. The scheduling SCI 642 may assist the UE 615b in receiving and decoding the sidelink data. In an example, the scheduling SCI 642 may indicate a TTI duration and/or a frequency interlace or RBs within the frequency interlace where the sidelink data is transmitted, a MCS used for transmitting the sidelink data, a transmission power used for transmitting the sidelink data, and/or any other transmission related parameters. To provide frequency diversity, the UE 615a may transmit the PSCCH communication 612 using a highest-frequency RB (e.g., RB(0)) and repeat the transmission in a lowest-frequency RB (e.g., RB (9)) of the frequency interlace $308_{I(0)}$. The UE 615a may transmit the PSSCH communication 610 in remaining RBs of the frequency interlace $308_{I(0)}$.

To provision for sidelink COT sharing, the UE 615a may additionally include a sidelink COT sharing SCI 640 in the PSCCH communication 612. In some aspects, the SCI 640 may indicate remaining unused frequency interlaces 308 so that other sidelink UE(s) (e.g., a UE 615c) monitoring for the sidelink COT sharing SCI 640 may opportunistically join the COT 602 and utilize the remaining unused frequency interlaces 308 for sidelink transmission. In this regard, the UE 615a may include in the SCI 640, an indication of the remaining unused frequency interlace(s) 308. In the illustrated example of FIG. 6, the SCI 640 may indicate that the frequency interlace $308_{I(1)}$ to the frequency interlace $308_{I(9)}$ are available for sharing. In some other instances, the UE 615a may include in the SCI 640 including a reservation or indication of the frequency interlace(s) 308 that are to be used by the UE 615a. In the illustrated example of FIG. 6, the SCI 640 may indicate that the frequency interlace $308_{I(0)}$ is in use or reserved by the UE 615a, and thus other UEs desiring to join the COT 602 may refrain from using the reserved frequency interlace $308_{I(0)}$.

Additionally, the SCI 640 may indicate how long the COT 602 may last so that another UE desiring to join the COT 602 may know how long a channel access is allowed when utilizing an unused frequency interlace 308. In this regard, the UE 615a may include in the SCI 640 a duration of the COT 602 and/or an end time of the COT 602 (e.g., a time T1). As described above, a UE winning a COT may use the COT for multiple sidelink transmissions over multiple TTIs or slots to avoid incurring additional LBT overhead or delay. In the illustrated example of FIG. 6, the UE 615a schedules three slots 606 in the COT 602. In some other instances, the UE 615a may schedule 2, 4, 5 or slots for the sidelink communication with the UE 615b. For instance, the PSSCH communication 610 may include one TB spanning three slots 606. The UE 615a may include slot or TTI aggregation information in the scheduling SCI 642 indicating an aggregation of three slots for the schedule. In some other instances, the UE 615a may transmit the sidelink communication (e.g., including PSSCH and PSCCH) to different UEs in different slots 606 within the COT 602. For example, the UE 615a may schedule three UEs for sidelink communications during the COT 602, each having a schedule of 4 slots 606. The UE 615a may indicate a duration of 16 slots 606 for the COT 602 in the COT sharing SCI 640 and indicate a duration of 4 slots in the scheduling SCI 642 for the first PSSCH schedule. While FIG. 6 illustrates the SCI 640 and SCI 642 as separate messages, in some instances, the SCI 640 the SCI 642 may be transmitted in a single SCI message. In other words, the COT sharing information (shown by the SCI 640) can be included as part of the SCI 642.

In the scheme 600, a UE 615c may monitor for sidelink COT sharing information from other sidelink UEs. As discussed above, the COT sharing information (e.g., the SCI 640) can be included as part of the regular SCI 642 transmitted in a PSCCH for sidelink communication. Since the COT sharing information is carried in a PSCCH, the UE 615c may perform the monitoring based on a PSCCH resource mapping, which may be predetermined (e.g., at a highest-frequency RB and a lowest-frequency RB of a frequency interlace), discovered via a sidelink discovery procedure and/or configured by a serving BS. The UE 615c may detect the COT sharing SCI 640 transmitted by the UE 615a as shown by the dashed link with the checkmark. The UE 615c may recover information associated with the unoccupied frequency interlaces 308 in the COT 602 from the SCI 640. The UE 615c may be interested in using one or more unused frequency interlaces 308 indicated by the SCI 640. In the illustrated example of FIG. 6, the UE 615c selects the frequency interlace $308_{I(1)}$ in the COT 602 for PSSCH/PSCCH communication 620. However, in some other instances, the UE 615c may select another frequency interlace $308_{I(m)}$ for the PSSCH/PSCCH communication 620, where m may be between 2 and 9, and may select more than one unoccupied frequency interlace 308 for the PSSCH/PSCCH communication 620. The UE 615c may transmit the PSSCH/PSCCH communication 620 using substantially similar mechanisms as the UE 615a. where the PSCCH may be transmitted in a highest-frequency RB and a lowest-frequency RB of the selected frequency interlace $308_{I(1)}$ and the PSSCH may be transmitted using remaining RBs of the selected frequency interlace $308_{I(1)}$. The UE 615c joining the COT 602 initiated by the UE 615a may be referred to as a responding UE.

In some aspects, to reduce the probability of multiple monitoring sidelink UEs in the neighborhood of the UE 615a from selecting the same unoccupied frequency interlace 308 in the COT 602 for sidelink transmission, a UE desiring to join the COT 602 may hash a random number and select an unoccupied frequency interlace 308 based on the hashed random number. For instance, when there are X number of available frequency interlaces 308 in the COT 602, the responding UE 615b may draw a random number between 0 and X−1 and select an unoccupied frequency interlace 308 based on the drawn random number.

In some aspects, the UE 615a may schedule one or more transmission gap periods 604 in the COT 602. The gap periods 604 allow for a monitoring sidelink UE (e.g., the UE 615c) to perform a category 2 (CAT2) LBT 632 prior to joining the COT 602. A CAT2 LBT may be referred to as a one-shot LBT with no random backoff. In some instances, the gap period 604 may have a duration of about 16 microseconds (μs). The UE 615a may determine locations of the gap periods 604 within the COT 602. For instance, the UE 615a may determine a gap periods 604 such that the relative time between the SCI 640 and the gap period 604 is long enough to allow a monitoring UE to process and decode the SCI 640. The UE 615a may indicate timing information of the gap period 604 in the SCI 640 to facilitate LBT at the monitoring UE. In this regard, the SCI 640 may include a start time of the gap period 604, an end time of the gap period 604, where the start time and/or the end time may be relative to a time location of the SCI 640 (e.g., in units of symbol time or any time units). For instance, the responding UE 615c may recover timing information associated with the gap periods 604 from the SCI 640. The UE 615c may perform an LBT 632 during a gap period 604 indicated by the SCI 640 and transmit the PSSCH/PSCCH communication 620 if the LBT 632 passes.

In some aspects, the UE 615a may perform the CAT4 LBT 630 based on a certain CAPC. The CAPC may determine what type or priority of traffic that the UE 615a may transmit in the COT 602 and/or a transmission power or duration that the UE 615a may use for transmissions in the COT 602 upon passing the CAT4 LBT 630. To facilitate COT sharing, the UE 615a may include in the SCI 640, an indication of the CAPC to provide the responding UE 615c with CAPC information. Upon receiving the SCI 640, the UE 615c may recover the CAPC information and use the COT 602 for traffic with the same CAPC or a lower CAPC than the CAPC indicated in the SCI 640.

In general, the sidelink UE 615a may include COT sharing information, such as information associated with one or more of the unoccupied frequency interlaces in the COT 602, the end time of the COT 602, the duration of the COT 602, gap period(s) 604 in the COT 602, and/or the CAPC associated with the CAT4 LBT 630 used for acquiring the COT 602, in the SCI 640.

FIG. 7 illustrates a sidelink COT sharing scheme 700 according to some aspects of the present disclosure. The scheme 700 provisions for COT sharing among sidelink UEs (e.g., the UEs 115, 215, and/or 400) using time domain-based sharing. The scheme 700 may be applied to share a COT in the frequency band 302 of FIG. 3. In the scheme 700, a UE 715a (e.g., the UEs 115, 215, 400, and/or 615) may initiate or contend for a COT 702 in the frequency band 302 by performing a CAT4 LBT 730 (e.g., the LBT 630) in the frequency band 302. The LBT 730 is a pass as shown by the checkmark indicating that the UE 615a won the COT 702. After winning the COT 702, the UE 715a may transmit PSSCH communication 710 and PSCCH communication 712 to a UE 715b. The PSSCH communication 710 may include sidelink data substantially similar to the PSSCH communication 610. The PSCCH communication 712 may include scheduling SCI 742 (e.g., the SCI 642) associated with a transmission of the PSSCH communication 710.

The UE 715a may transmit the PSSCH communication 710 and the PSCCH communication 712 using a similar frequency interlace structure as described in the schemes 300 and 600. For instance, the UE 715a may use all the frequency interlaces (e.g., the frequency interlaces 308) in the frequency band 302 for the PSSCH communication 710 and the PSCCH communication 712, where the PSCCH communication 712 is transmitted in the highest-frequency RB and the lowest-frequency RB within frequency band 302. In some instances, the UE 715a acquired COT 702 may have a longer duration that what is needed for the PSSCH communication 710. For instance, the UE 715a may acquire the COT 702 based on a CAPC for a certain traffic (to be carried by the PSSCH communication 710). However, the COT 702 according to the CAPC may have a longer duration than the duration of the PSSCH communication 710. As shown in FIG. 7, the PSSCH communication 710 is communicated using a portion of time resources in the COT 702 (e.g., in a period 704) and there is time remaining in the COT 702 after the PSSCH communication 710.

To provision for sidelink COT sharing, the UE 715a may additionally include sidelink COT sharing SCI 740 in the PSCCH communication 712. In some aspects, the SCI 740 may indicate remaining unused time resources (e.g., the period 706) in the COT 702 so that other sidelink UE(s) (e.g., a UE 715c) monitoring for the sidelink COT sharing SCI 740 may opportunistically join the COT 702 and utilize the remaining unused time period 706 in the COT 702 for sidelink transmission. In this regard, the UE 715a may include in the SCI 740, timing information associated with the unoccupied time period 706. In this regard, the UE 715a may include in the SCI 740, a transmission end time 760 (e.g., a time T1) of the PSSCH communication 710, a starting time (e.g., a time T2) when sharing of the COT 702 may start UE may join the COT 702 (e.g., T2), and/or an end time 762 (e.g., a time T6) of the COT 702.

In some aspects, to reduce the probability of multiple monitoring sidelink UEs in the neighborhood of the UE 715a from selecting the same unoccupied time resources in the COT 602 for sidelink transmission, the scheme 700 may apply a contention time slot grid 709 in the unoccupied time period 706 for contention. The grid 709 may include a plurality of contention slots 708, where a monitoring sidelink UE may contend for resources in the unoccupied time period 706. The time slot grid 709 may start at time T2, after a delay 707. The delay 707 may have a duration long enough for a monitoring sidelink UE to perform a CAT2 LBT. Each contention slot 708 may have a duration long enough for a one-shot LBT measurement. In some instances, the delay 707 may be about 25 μs long and each contention slot 708 may be about 9 μs long. In general, the delay 707 and the contention slots 708 may have any suitable duration, but the delay 707 may generally be longer than the duration of a contention slot 708. A UE interested in joining the COT 702 may select a contention slot 708 based on a hashed random number and perform a CAT2 LBT for the selected contention slot 708. To facilitate the use of the contention slots 708, the UE 715a may include in the SCI 740, an indication of the contention time slot grid 709. For instances, the SCI 740 may indicate the delay 707, the starting time (e.g., time T2) of an earliest contention slot 708 in the period 706, and/or a duration of a contention slot 708.

In the illustrated example of FIG. 7, a UE 715c may monitor for sidelink COT sharing information from other sidelink UEs. The UE 715c may detect the COT sharing SCI 740 transmitted by the UE 715a as shown by the dashed link with the checkmark between the UE 715a and the UE 715c. The UE 715c may recover information associated with the unoccupied time period 706 and/or the contention time slot grid 709 from the SCI 740. The UE 715c may hash a random number (e.g., a hashed value 770), which may correspond to the third contention slot 708 in the period 706. The UE 715c may perform a CAT2 LBT 732 according to the hashed contention slot 708, for example, before the start of the hashed third contention slot 708. The CAT2 LBT 732 is a pass as shown by the checkmark. Thus, the UE 715c proceed to transmit PSSCH/PSCCH communications 720. A monitoring sidelink UE 715d in the neighborhood of the UE 715a may also detect the COT sharing 740 as shown by the dashed link with the checkmark between the UE 715d and the UE 715a. The UE 715d may desire to join the COT 702. The UE 715d may hash a random number (e.g., the hashed value 772), which may correspond to the seventh contention slot 708 in the period 706. The UE 715d may perform a CAT2 LBT according the hashed contention slot 708, for example, before the start of the hashed seventh contention slot 708. However, the UE' 715c's transmission is ongoing during the time when the CAT2 LBT is performed. Thus, the CAT2 LBT is a failure as shown by the cross symbol. The UE 715d may attempt to contend again at a later time, by hashing another random number (e.g., the rehashed value 774), which may correspond to a twelve contention slot 708 in the period 706. The UE 715d may perform a CAT2 LBT 734 according the rehashed contention slot 708, for example, before the start of the hashed twelve contention slot 708 and the CAT2 LBT 734 is a pass as shown by the checkmark since the UE 715's transmission is completed. Thus, the UE 715d may proceed to transmit PSSCH/PSCCH communication 750. While FIG. 7 illustrates two sidelink UEs 715c and 715d sharing the COT 702 of the UE 715a. In some instances, the COT 702 may be shared by a single sidelink UE or more than two sidelink UEs (e.g., about 3, 4, 5 or more).

In some aspects, the hashing function used for selecting a contention slot 708 for joining the COT 702 may be dependent on a priority class of the sidelink UE's traffic. In this regard, a sidelink UE having a higher priority may be configured to statistically select an earlier contention slot 708 than a sidelink UE having a lower priority. For instance, the unoccupied period 706 may have N contention slots 708, the high-priority UE may hash a random number in an interval between 1 to K, where K<N, and the low-priority UE may hash a random number in an interval between K+1 to N.

In some aspects, similar to the scheme 600, the UE 715a may perform the CAT4 LBT 730 based on a certain CAPC for the PSSCH communication 710. The UE 715a may include in the SCI 740, an indication of the CAPC. The responding UE 715c and/or 715d may transmit traffic with the same CAPC or a lower CAPC than the CAPC indicated in the SCI 740.

In general, the sidelink UE 715a may include COT sharing information, such as information associated with one or more of the unoccupied time period 706, the PSSCH communication 710 end time (e.g., the time T1), the starting time (e.g., T2) for sharing the COT 702, the end time of the COT 702, the duration of the COT 702, the delay 707 after the end of the PSSCH communication 710 when COT sharing may start, the contention time slot grid 709, and/or the CAPC associated with the CAT4 LBT 730 used for acquiring the COT 702, in the SCI 740.

FIG. 8 illustrates a sidelink COT sharing scheme 800 according to some aspects of the present disclosure. The scheme 800 is substantially similar to the scheme 700 and may provide mechanisms for propagating sidelink COT sharing information indicated by a COT initiating sidelink UE (e.g., the UEs 115, 215, 400, 615, and/or 715). The scheme 800 is described using the same COT sharing structure as in the scheme 700, and may use the same reference numerals as in FIG. 7 for simplicity sake. However, the LBTs 730, 732, and/or 734 and the contention time slot grid 709 are not shown in FIG. 8 for purposes of simplicity of illustration and discussion.

In the scheme 800, the detectability of the SCI 740 may be different than in the scheme 700. As shown in FIG. 8, the UE 715c may detect the SCI 740 transmitted by the UE 715a as shown by the dashed link with the checkmark between the UE 715c and the UE 715a. The UE 715c may determine to join the COT 702 and transmit a PSSCH communication 820 and PSCCH communication 822 during the unoccupied period 706 using mechanisms as described in the scheme 700. The PSSCH communication 820 and PSCCH communication 822 may correspond to the PSSCH/PSCCH communication 720 of FIG. 7. The UE 715b may additionally repeat at least some of the COT sharing information transmitted by the UE 715a. In this regard, the UE 715c may transmit SCI 840 in the PSCCH communication 822 in addition to scheduling SCI for the PSSCH communication 820. The SCI 840 may include at least some COT sharing information (e.g., the unoccupied time period 706, the delay 707, the contention time slot grid 709, and/or the CAPC) recovered from the SCI 740. In some instances, the SCI 840 may have the same message structure as the SCI 740.

In the illustrated example of FIG. 8, the UE 715d may not detect the SCI 740 transmitted by the UE 715a as shown by the dashed line with the cross symbol between the UE 715d and the UE 715a. However, the UE 715d may detect the SCI 840 transmitted by the UE 715c as shown by the dashed line with the checkmark between the UE 715d and the UE 715c. Thus, the UE 715d may also join the COT 702 and transmit the PSSCH/PSCCH communication 750 during the period 706 using mechanisms described in the scheme 700.

As can be observed, in the scheme 800, a sidelink UE (e.g., the UE 715d) may join a COT initiated by another sidelink UE (e.g., the UE 715a) as long as the sidelink UE can detect COT sharing information SCI (e.g., the SCI 840) transmitted by the initiating UE or a responding UE (e.g., the UE 715c) propagating the COT sharing information.

FIG. 9 illustrates a sidelink COT sharing scheme 900 according to some aspects of the present disclosure. The scheme 900 is described using the same COT sharing structure as in the schemes 700 and 800, and may use the same reference numerals as in FIG. 7 for simplicity sake. Similar to the scheme 800, the scheme 900 provides mechanisms for propagating sidelink COT sharing information indicate by a COT initiating sidelink UE (e.g., the UEs 115, 215, 400, 615, and/or 715). However, in the scheme 900, a sidelink UE that can only detect propagated COT sharing information, but not the initiating COT sharing information, the sidelink UE may only join the COT after the propagating UE has completed its transmission in the COT.

As shown in FIG. 9, the COT sharing SCI 740 detectability is the same as the scheme 800, where the UE 715c may detect the initiating UE 715a's SCI 740 and the UE 715d may detect the propagated SCI 840, but not the initiating UE 715a's SCI 740. Thus, the UE 715c may join the COT 702 and repeat at least some of the SCI 740 in the SCI 940 (e.g., the SCI 840) using similar mechanisms as described in the scheme 800. The UE 715d failing to detect the SCI 740 transmitted by the COT initiating UE 715a, the UE 715d may not join the COT 702 to transmit the PSSCH/PSCCH communication 750 as indicated by the cross symbol.

In some aspects, to enable a monitoring sidelink UE to differentiate between propagated COT sharing information (e.g., the SCI 940) and initiating COT sharing information, the responding UE 715c may include in the SCI 940, an indication that the COT 702 is not sharable so that a UE detecting the SCI 940, but failing to detect the initiating SCI 740 may refrain from joining the COT 702.

In some aspects, the responding UE 715c may further include in the SCI 940, timing information associated with the PSSCH communication 820, such as an end time (e.g., a time T1) or a duration of the PSSCH communication 820 so that the UE 715d failing to detect the initiating SCI 740 may attempt to join the COT 702 after the propagating UE 715c has completed the PSSCH communication 820. In the illustrated example of FIG. 9, the UE 715d may perform an LBT (e.g. based on a hashed value) after the end of the PSSCH communication 820 and transmit a PSSCH/PSCCH communication 750 when the LBT passes. The inclusion of the PSSCH communication 820 timing information in the SCI 940 can save the UE 715d's effort in performing LBT while the PSSCH communication 820 is ongoing.

While the schemes 800 and 900 are described in the context of time domain-based sharing, the COT sharing information propagation mechanisms may be applied to the interlaced-based sharing described in the scheme 600. For instance, a responding UE (e.g., the UE 615c) may include in a PSSCH transmission, at least some COT sharing information indicated by the initiating SCI 640 and/or an indication of the frequency interlace used by the responding UE.

In some aspects, HARQ techniques may be applied to sidelink communication (e.g., D2@, V2V, V2X and/or C-V2X) to improve communication reliability. In some instances, a sidelink UE may be configured with a pool of PSSCH/PSCCH resources and a pool of PSFCH resources (for ACK/NACK transmissions). There may be a mapping between the pool of PSSCH/PSCCH resources and the pool of PSFCH resources. Each PSSCH/PSCCH transmission may be mapped to a PSFCH resource. In other words, there is a corresponding PSFCH resource for each PSSCH/PSCCH transmission. In some instances, the PSSCH/PSCCH transmission and the PSFCH transmission may not be adjacent to each other. Thus, COT sharing between PSSCH/PSCCH transmission and the PSFCH transmission may be difficult. However, it may be advantageous to configure the PSFCH resource to be within a COT of the PSSCH/PSCCH transmission to save LBT overhead or delay.

FIGS. 10A and 10B collectively illustrate a sidelink communication scheme 1000 according to some aspects of the present disclosure. The scheme 1000 may be employed by UEs such as the UEs 115 and 215 in a network such as the networks 100 and/or 200. In particular, the UEs may apply HARQ techniques to sidelink communication over a sidelink such as the sidelinks 251 and 252 as shown in the scheme 1000. In FIGS. 10A and 10B, the x-axes represent time in some arbitrary units, and the y-axes represent frequency in some arbitrary units. The scheme 1000 may apply a similar frequency-interlaced resource structure as the scheme 300, and may use the same reference numerals for simplicity sake.

Referring to FIG. 10A, a UE 1015a may contend for a COT 1002 in the frequency band 302 for sidelink communication with a UE 1015b using HARQ by performing a CAT4 LBT 1030. The UEs 1015a and 1015b may be similar to the UEs 115, 215, 400, 615, and 715. After winning the COT 1002, the UE 1015a transmits a PSSCH communication 1010 and PSCCH communication 1012 to the UE 1015b. The PSSCH communication 1010 may include sidelink data associated with a HARQ process. The PSCCH communication 1012 may include SCI 1040 indicating resource information for the PSSCH communication 1010.

In some aspects, the SCI 1040 may additionally indicate resources (e.g., starting at time T1) 1042 allocated for a PSFCH communication 1020 (for indicating an ACK/NACK feedback for the sidelink data) as shown by the dashed arrow 1004. In some instances, the SCI 1040 may indicate the resource 1042 by indicating a delay between a reception of the SCI 1040 and a transmission of the ACK/NACK. Additionally or alternatively, the SCI 1040 may indicate an LBT type for the PSFCH communication 1020 as shown by the dashed arrow 1005. The LBT type may be a CAT2 LBT or a CAT4 LBT depending on whether the ACK/NACK resource 1042 is within the COT 1002. In the illustrated example of FIG. 10A, the ACK/NACK resource 1042 is within the COT 1002. Accordingly, the SCI 1040 may indicate a CAT2 LBT type for the PSFCH communication 1020.

Upon detecting the SCI 1040, the UE 1015*b* may receive and decode the PSSCH communication 1010 and transmit a PSFCH communication 1020 to the UE 1015*a* to provide a reception status of the PSSCH communication 1010. For instance, if the UE 1015*b* successfully decoded the sidelink data in the PSSCH communication 1010, the UE 615*b* may transmit an ACK in the PSFCH communication 1020. Conversely, if the UE 1015*b* fails to decode the sidelink data from the PSSCH communication 1010, the UE 1015*b* may transmit a NACK in the PSFCH communication 1020. The UE 1015*b* may perform a CAT2 LBT 1032 prior to transmitting the PSFCH communication 1020 based on the LBT type information. The PSFCH communication 1020 may be transmitted when the LBT 1032 is a pass.

Referring to FIG. 10B, the UE 1015*a* may use substantially similar mechanisms as in the FIG. 10A to communicate sidelink data with HARQ and indicate resources and/or LBT type for the PSFCH communication 1020. However, FIG. 10B illustrates a scenario when PSFCH resources are in a different resource pool than the PSSCH communication 1010. As shown in FIG. 10B, the PSFCH resource 1046 is outside the COT 1002. Accordingly, the UE 1015*a* may transmit SCI 1044 in the PSCCH communication 1012 indicating a CAT4 LBT type for the LBT 1034 prior to the PSFCH communication 1020 as shown by the dashed arrow 1007. The SCI 1044 may also indicate the resource 1046 as shown by the dashed arrow 1006.

In some aspects, UEs (e.g., the UEs 115, 215, 615, 715, and/or 1015) may utilize the scheme 1000 to communicate sidelink communications with HARQ in conjunction with the schemes 600, 700, 800, and/or 900 described above with respect to FIGS. 6, 7, 8, and/or 9, respectively, for frequency interlace-based COT sharing and/or time domain COT sharing.

In some aspects, a BS (e.g., the BSs 105, 205, and/or 500) may assist a sidelink UE (e.g., the UEs 115, 215, 400, 615, 715, and/or 1015) in performing COT sharing and/or sidelink HARQ communication as described above in schemes 600, 700, 800, 900, and/or 1000. For instance, the BS may configure the sidelink UE with a pool sidelink resources, for example, including a certain duration and/or periodicity when the sidelink UE may contend for sidelink COTs (e.g., the COTs 602, 702, and/or 1002) and/or certain frequency interlace(s) where the sidelink UE may use for sidelink communications after the sidelink UE won a COT. The BS may configure the sidelink UE with rules for sidelink COT sharing. For instance, the BS may indicate whether the sidelink UE is allowed to share a sidelink COT with another sidelink UE or what COT sharing mode the sidelink UE may use for COT sharing. The COT sharing mode may include a frequency interlace-based sharing mode as discussed above in the scheme 600 with respect to FIG. 6 and a time domain-based sharing mode as discussed above in the scheme 700. The BS may also indicate whether propagation of sidelink COT sharing information is allowed and how the sidelink UE may respond to propagated sidelink COT sharing information as discussed in the schemes 800 and 900 with respect to FIGS. 8 and 9, respectively.

Figure 11:
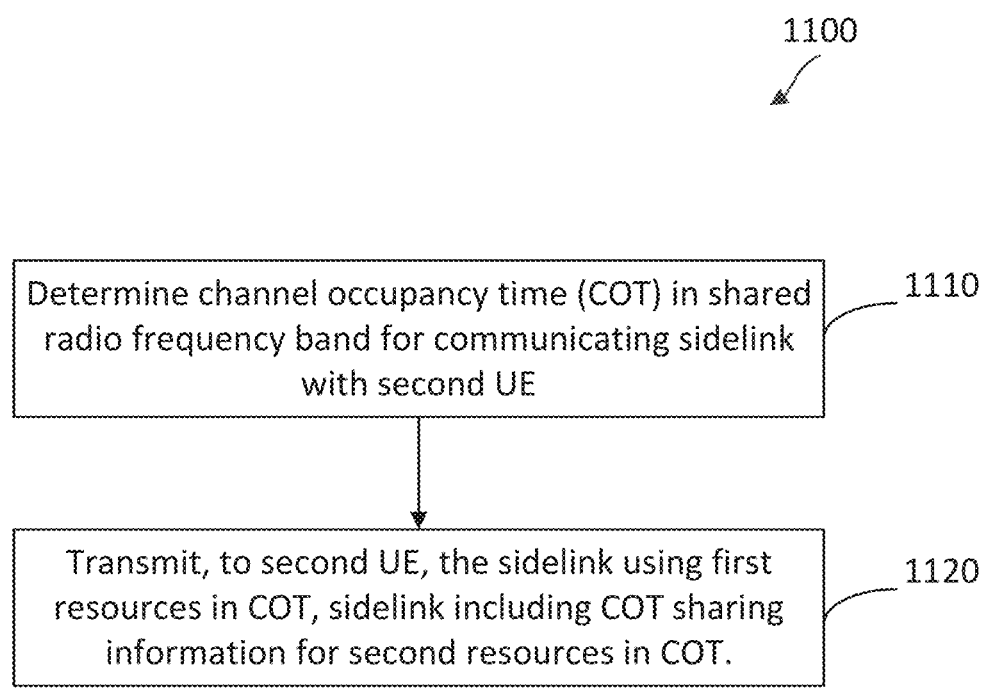
FIG. 11 is a flow diagram of a sidelink communication method according to some aspects of the present disclosure.

FIG. 11 is a flow diagram of a sidelink communication method 1100 according to some aspects of the present disclosure. Steps of the method 1100 can be executed by a computing device (e.g., a processor, processing circuit, and/or other suitable component) of a wireless communication device or other suitable means for performing the steps. For example, a wireless communication device, such as the UE 115, 215, 400, 615, 715, or 1015, may utilize one or more components, such as the processor 402, the memory 404, the sidelink communication module 408, the transceiver 410, the modem 412, and the one or more antennas 416, to execute the steps of method 1100. The method 1100 may employ similar mechanisms as in the schemes 600, 700, 800, and/or 900 described above with respect to FIGS. 6, 7, 8, and/or 9, respectively. As illustrated, the method 1100 includes a number of enumerated steps, but aspects of the method 1100 may include additional steps before, after, and in between the enumerated steps. In some aspects, one or more of the enumerated steps may be omitted or performed in a different order.

At step 1110, the method 1100 includes determining, by a first UE (e.g., the UEs 115, 215, 400, 615, 715, and/or 1015), a COT (e.g., the COTs 320, 602, 702, and/or 1002) in a shared radio frequency band (e.g., the frequency band 302) for communicating a sidelink (e.g., the PSSCH communications 610, 710, and/or 1010 and/or PSCCH communications 612, 712, 822, and/or 1012 and/or the PSSCH/PSCCH communications 620, 720, and/or 750) with a second UE (e.g., the UEs 115, 215, 400, 615, 715, and/or 1015). In some instances, the first UE may correspond to the UE 400 and may utilize one or more components, such as the processor 402, the sidelink communication module 408, the transceiver 410, the modem 412, and the one or more antennas 416, to determine the COT in the shared radio frequency band for the communicating the sidelink with the second UE according to the schemes 600 and/or 700 described above with respect to FIGS. 6 and/or 7, respectively. In some instances, the first UE may utilize the transceiver 410, the modem 412, and the one or more antennas 416 to receive a signal in the shared radio frequency band. The first UE may utilize the processor 402 to perform an LBT by measuring the signal energy of the received signal and comparing the measured signal energy to a detection threshold. The first UE may utilize the processor 402 and/or the sidelink communication module 408 to determine the COT based on the LBT being successful (e.g., the measured signal energy being below the threshold).

At step 1120, the method 1100 includes transmitting, by the first UE to the second UE, the sidelink using first resources in the COT, the sidelink including COT sharing information for second resources in the COT. In some aspects, the sidelink may include sidelink data (e.g., PSSCH communications 610, 710, and/or 1010) and SCI (e.g., the SCIs 640 and/or 740) including the COT sharing information. In some instances, the first UE may correspond to the UE 400 and may utilize one or more components, such as the processor 402, the sidelink communication module 408, the transceiver 410, the modem 412, and the one or more antennas 416, to transmit, to the second UE, the sidelink using the first resources in the COT.

In some aspects, the shared radio frequency band includes a plurality of frequency interlaces of RBs (e.g., the frequency interlaces 308) The step 1120 includes transmitting, by the first UE to the second UE, the sidelink using the first resources including a first frequency interlace (e.g., the frequency interlaces $308_{I(0)}$) of the plurality of frequency interlaces during the COT. In some aspects, the COT sharing information indicates the second resources including a second frequency interlace (e.g., the frequency interlaces $308_{I(1)}$) of the plurality of frequency interlaces available during the COT. In some aspects, the COT sharing information indicates a gap period (e.g., the gap periods 604) in the COT for performing an LBT (e.g., the LBTs 632) prior to using the second frequency interlace during the COT. In some aspects, the method 1100 further includes refraining, by the first UE, from transmitting in the shared radio frequency band during the gap period. The method further includes transmitting, to a third UE, another sidelink using a third frequency interlace during the COT after the gap period. In some instances, the third UE may be the same as the second UE. In some other instances, the third UE may be different from the second UE. In some instances, the third frequency interlace may be the same as first frequency interlace. In some other instances, the third frequency interlace may be a different frequency interlace than first frequency interlace. In some instances, the first UE may correspond to the UE 400 and may utilize one or more components, such as the processor 402, the sidelink communication module 408, the transceiver 410, the modem 412, and the one or more antennas 416, to refrain from transmitting in the gape period and transmit the another sidelink to the third UE.

In some aspects, the step 1110 includes determining the COT based on an LBT (e.g., the LBTs 630 and 730) associated with a CAPC and the COT sharing information indicates the CAPC.

In some aspects, the COT sharing information includes timing information associated with at least one of a duration of the COT or a duration (e.g., the period 706) of the second resources. In some aspects, the COT sharing information includes timing information associated with a set of contention slots (e.g., the contention slots 708) in the duration of the second resources. In some aspects, the COT sharing information comprises at least one of a starting time of an earliest contention slot of the set of contention slots, or a duration of a first contention slot of the set of contention slots.

Figure 12:
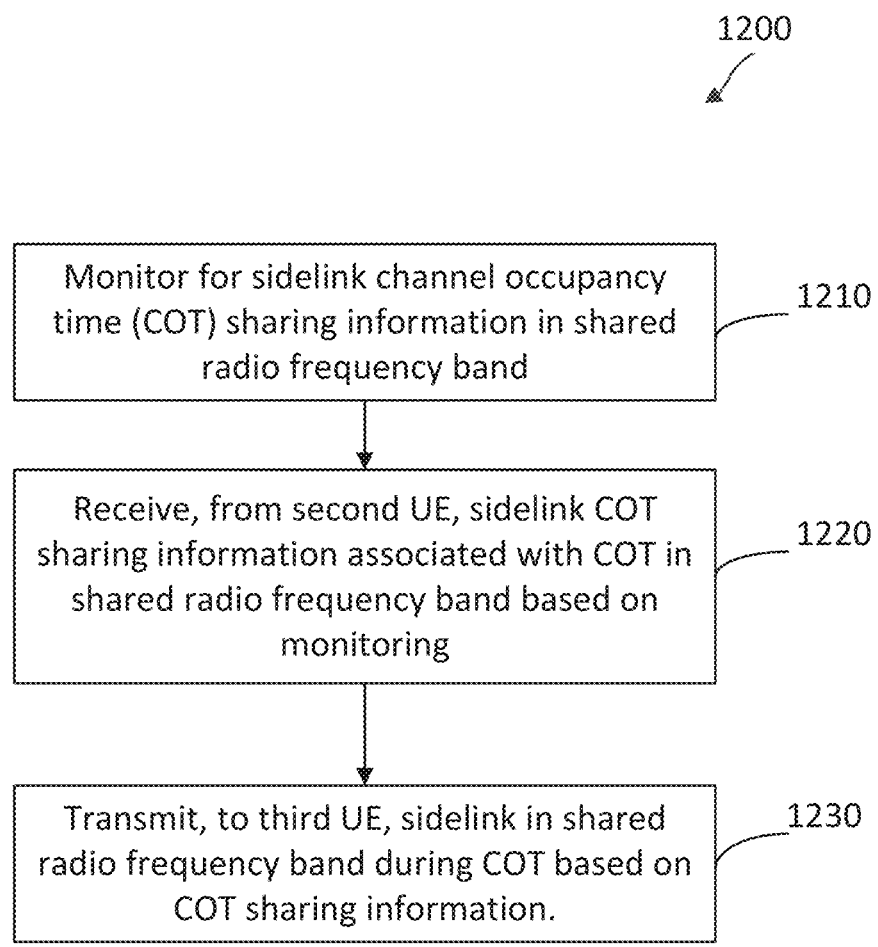
FIG. 12 is a flow diagram of a sidelink communication method according to some aspects of the present disclosure.

FIG. 12 is a flow diagram of a sidelink method 1200 according to some aspects of the present disclosure. Steps of the method 1200 can be executed by a computing device (e.g., a processor, processing circuit, and/or other suitable component) of a wireless communication device or other suitable means for performing the steps. For example, a wireless communication device, such as the UE 115, 215, 400, 615, 715, or 1015, may utilize one or more components, such as the processor 402, the memory 404, the sidelink communication module 408, the transceiver 410, the modem 412, and the one or more antennas 416, to execute the steps of method 1200. The method 1200 may employ similar mechanisms as in the schemes 600, 700, 800, and/or 900 described above with respect to FIGS. 6, 7, 8, and/or 9, respectively. As illustrated, the method 1200 includes a number of enumerated steps, but aspects of the method 1200 may include additional steps before, after, and in between the enumerated steps. In some aspects, one or more of the enumerated steps may be omitted or performed in a different order.

At step 1210, the method 1200 includes monitoring, by a first UE (e.g., the UEs 115, 215, 400, 615, 715, and/or 1015), for sidelink COT sharing information in a shared radio frequency band (e.g., the frequency band 302). In some instances, the first UE may correspond to the UE 400 and may utilize one or more components, such as the processor 402, the sidelink communication module 408, the transceiver 410, the modem 412, and the one or more antennas 416, to monitor for the sidelink COT sharing information according to the schemes 600, 700, 800, and/or 900 described above with respect to FIGS. 6, 7, 8, and/or 9, respectively. In some instances, the first UE may utilize the transceiver 410, the modem 412, and the one or more antennas 416 to receive signals in the shared radio frequency band. The first UE may utilize the processor 402, the sidelink communication module 408, and/or the modem 412 to perform decoding on the received signals and search for the sidelink COT sharing information from the decoded information based on a PSCCH resource mapping. The first UE may obtain the PSCCH resource mapping based on a pre-configuration (e.g., located at a highest-frequency RB and a lowest-frequency RB of a frequency interlace), a sidelink discovery procedure, and/or a configuration received from a serving BS.

At step 1220, the method 1200 includes receiving, by the first UE from a second UE (e.g., the UEs 115, 215, 400, 615, 715, and/or 1015), the sidelink COT sharing information associated with a COT (e.g., the COTs 320, 602, 702, and/or 1002) based on the monitoring. In some aspects, the first UE may receive the sidelink COT sharing information in SCI (e.g., the SCIs 640, 740, and/or 840).

In some instances, the first UE may correspond to the UE 400 and may utilize one or more components, such as the processor 402, the sidelink communication module 408, the transceiver 410, the modem 412, and the one or more antennas 416, to receive the sidelink COT sharing information.

At step 1230, the method 1200 includes transmitting, by the first UE to a third UE (e.g., the UEs 115, 215, 400, 615, 715, and/or 1015) different from the second UE, a sidelink (e.g., the PSSCH communications 610, 710, and/or 1010 and/or PSCCH communications 612, 712, 822, and/or 1012 and/or the PSSCH/PSCCH communications 620, 720, and/or 750) in the shared radio frequency band during the COT based on the COT sharing information. In some instances, the first UE may correspond to the UE 400 and may utilize one or more components, such as the processor 402, the sidelink communication module 408, the transceiver 410, the modem 412, and the one or more antennas 416, to transmit, to the third UE, the sidelink in the shared radio frequency band.

In some aspects, the sidelink COT sharing information indicates one or more frequency interlaces of RBs (e.g., the frequency interlaces 308) in the shared radio frequency band available in the COT. In some aspects, the step 1230 includes transmitting, by the first UE to the third UE, the sidelink using a first frequency interlace (e.g., the frequency interlaces $308_{I(O)}$) of the one or more frequency interlaces during the COT. In some aspects, the method 1200 further includes selecting, by the first UE, the first frequency interlace from the one or more frequency interlaces. In some instances, the first UE may correspond to the UE 400 and may utilize one or more components, such as the processor 402 and the sidelink communication module 408, to select the first frequency interlace. In some aspects, the method 1200 further includes performing, by the first UE, an LBT (e.g., the LBTs 632 and 732) in the shared radio frequency band, where the transmission is based on the LBT. In some instances, the first UE may correspond to the UE 400 and may utilize one or more components, such as the processor 402, the sidelink communication module 408, the transceiver 410, the modem 412, and the one or more antennas 416, to perform the LBT. In some instances, the first UE may perform the LBT by measuring signal energy of signal received from the shared radio frequency band, comparing the measured signal to a threshold, and determining whether the LBT is a pass or a failure based on the threshold comparison via the processor 402. In some aspects, the sidelink COT sharing information indicates a gap period (e.g., the gap periods 604) within the COT, and the LBT is performed during the gap period.

In some aspects, the sidelink COT sharing information includes information associated with a CAPC, and the sidelink is transmitted based on the CAPC.

In some aspects, the sidelink COT sharing information includes timing information associated with a sharing duration (e.g., the period 706) in the COT, and the step 1230 includes transmitting, by the first UE to the third UE, the sidelink within the sharing duration. In some aspects, the method 1200 further includes performing, by the first UE, an LBT (e.g., the LBTs 632 and 732) in the shared radio frequency band and the sidelink is transmitted based on the LBT. In some aspects, the sidelink COT sharing information includes timing information associated with contention slots (e.g., the contention slots 708) in the sharing duration, and the LBT is performed based on the timing information associated with the contention slots.

In some aspects, the COT is a COT of the second UE. In other words, the COT is initiated by the second UE.

In some aspects, the COT is a COT of a fourth UE different from the second UE. In other words, the COT is initiated by the fourth UE. In some aspects, the step 1230 includes transmitting, by the first UE, SCI including at least some of the sidelink COT sharing information received from the second UE to propagate the sidelink COT sharing information in the network. In some instances, the first UE may correspond to the UE 400 and may utilize one or more components, such as the processor 402, the sidelink communication module 408, the transceiver 410, the modem 412, and the one or more antennas 416, to transmit the SCI to propagate the sidelink COT sharing information in the network.

Figure 13:
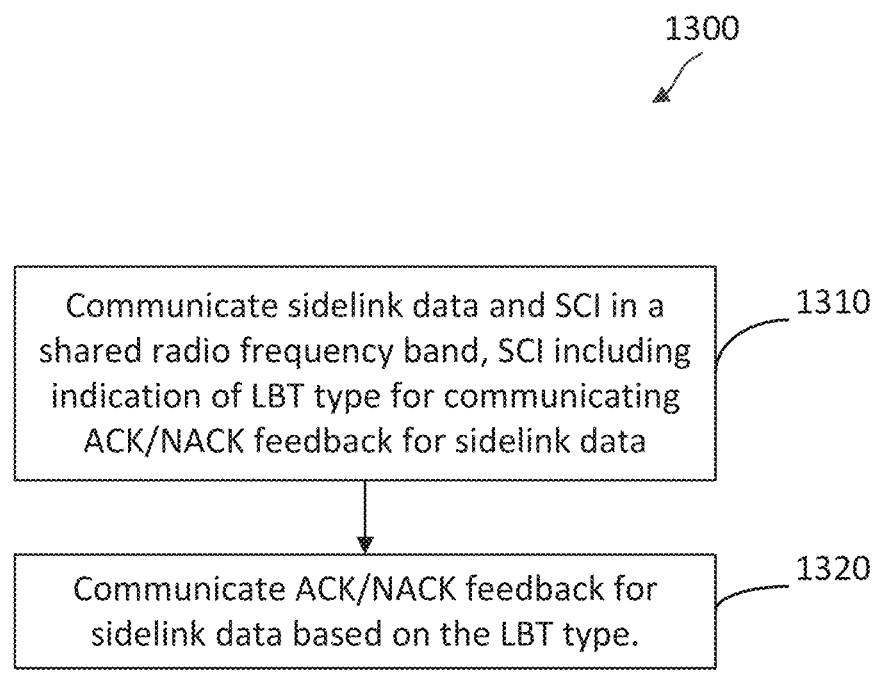
FIG. 13 is a flow diagram of a sidelink communication method according to some aspects of the present disclosure.

FIG. 13 is a flow diagram of a sidelink method 1300 according to some aspects of the present disclosure. Steps of the method 1300 can be executed by a computing device (e.g., a processor, processing circuit, and/or other suitable component) of a wireless communication device or other suitable means for performing the steps. For example, a wireless communication device, such as the UE 115, 215, 400, 615, 715, or 1015, may utilize one or more components, such as the processor 402, the memory 404, the sidelink communication module 408, the transceiver 410, the modem 412, and the one or more antennas 416, to execute the steps of method 1300. The method 1300 may employ similar mechanisms as in the scheme 1000 described above with respect to FIG. 10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At step 1310, the method 1300 includes communicating, by a first UE (e.g., the UEs 115, 215, 400, 615, 715, and/or 1015) with a second UE (e.g., the UEs 115, 215, 400, 615, 715, and/or 1015), sidelink data (e.g., the PSSCH communications 610, 710, 1010) and SCI (e.g., the SCI 1040 and 1044) in a shared radio frequency band (e.g., the frequency band 302), the SCI including an indication of an LBT type for communicating an ACK/NACK feedback (e.g., the PSFCH communication 1020) for the sidelink data. In some instances, the first UE may correspond to the UE 400 and may utilize one or more components, such as the processor 402, the sidelink communication module 408, the transceiver 410, the modem 412, and the one or more antennas 416, to communicate the sidelink data and the SCI by transmitting or receiving the sidelink data and the SCI.

At step 1320, the method 1300 includes communicating, by the first UE with the second UE, the ACK/NACK feedback for the sidelink data based on the LBT type. In some instances, the first UE may correspond to the UE 400 and may utilize one or more components, such as the processor 402, the sidelink communication module 408, the transceiver 410, the modem 412, and the one or more antennas 416, to communicate the ACK/NACK feedback for the sidelink data by transmitting or receiving the ACK/NACK feedback.

In some aspects, the step 1310 includes communicating, by the first UE with the second UE, the sidelink data and the SCI during a COT (e.g., the COTs 320, 602, 702, and/or 1002) in the shared radio frequency band.

In some aspects, the LBT type indicates CAT2 LBT (e.g., the CAT2 LBT 1032) based on resources (e.g., the resources 1042) for communicating the ACK/NACK feedback being within a duration of the COT.

In some aspects, the LBT type indicates a CAT4 LBT (e.g., the CAT4 LBT 1034) based on a resource (e.g., the resources 1046) for communicating the ACK/NACK feedback being outside a duration of the COT.

In some aspects, the method 1300 further includes determining, by the first UE, the COT in the shared radio frequency band. In some instances, the first UE may correspond to the UE 400 and may utilize one or more components, such as the processor 402, the sidelink communication module 408, the transceiver 410, the modem 412, and the one or more antennas 416, to determine the COT. In some instances, the first UE may utilize the transceiver 410, the modem 412, and the one or more antennas 416 to receive a signal in the shared radio frequency band. The first UE may utilize the processor 402 to perform an LBT by measuring the signal energy of the received signal and comparing the measured signal energy to a detection threshold. The first UE may utilize the processor 402 and/or the sidelink communication module 408 to determine the COT based on the LBT being successful (e.g., the measured signal energy being below the threshold).

In some aspects, the SCI indicates a resource (e.g., the resources 1042 or 1046) for communicating the ACK/NACK feedback.

In some aspects, the step 1310 includes transmitting, by the first UE to the second UE, the sidelink data and the SCI in the shared radio frequency band and the step 1310 includes receiving, by the first UE from the second UE, the ACK/NACK feedback in the shared radio frequency band.

In some aspects, the step 1310 includes receiving, by the first UE from the second UE, the sidelink data and the SCI in the shared radio frequency band and the step 1320 includes transmitting, by the first UE to the second UE, the ACK/NACK feedback in the shared radio frequency band.

Further embodiments of the present disclosure include a method of wireless communication. The method of wireless communication includes determining, by a first user equipment (UE), a channel occupancy time (COT) in a shared radio frequency band for communicating a sidelink with a second UE. The method of wireless communication also includes transmitting, by the first UE to the second UE, the sidelink using first resources in the COT, the sidelink including COT sharing information for second resources in the COT.

The method may also include one or more of the following features. For instance, the method includes where the transmitting the sidelink includes transmitting, by the first UE to the second UE, sidelink data and sidelink control information (SCI) using the first resources, the SCI including the COT sharing information. The shared radio frequency band includes a plurality of frequency interlaces of resource blocks (RBs), and where the transmitting includes transmitting, by the first UE to the second UE, the sidelink using the first resources including a first frequency interlace of the plurality of frequency interlaces during the COT. The COT sharing information indicates the second resources including a second frequency interlace of the plurality of frequency interlaces available during the COT. The COT sharing information indicates a gap period in the COT for performing a listen-before-talk (LBT) prior to using the second frequency interlace during the COT. The method may include refraining, by the first UE, from transmitting in the shared radio frequency band during the gap period; and transmitting, by the first UE to a third UE, another sidelink using a third frequency interlace during the COT after the gap period. The determining is based on a listen-before-talk (LBT) associated with a channel access priority class (CAPC), and where the COT sharing information indicates the CAPC. The COT sharing information includes timing information associated with at least one of a duration of the COT or a duration of the second resources. The COT sharing information includes timing information associated with a set of contention slots in the duration of the second resources. The COT sharing information includes at least one of a starting time of an earliest contention slot of the set of contention slots, or a duration of a first contention slot of the set of contention slots.

Further embodiments of the present disclosure include a method of wireless communication. The method of wireless communication includes monitoring, by a first user equipment (UE), for sidelink channel occupancy time (COT) sharing information in a shared radio frequency band. The method of wireless communication also includes receiving, by the first UE from a second UE, the sidelink COT sharing information associated with a COT based on the monitoring. The method of wireless communication also includes transmitting, by the first UE to a third UE different from the second UE, a sidelink in the shared radio frequency band during the COT based on the COT sharing information.

The method may also include one or more of the following features. For instance, the method includes where the receiving the sidelink COT sharing information includes receiving, by the first UE from the second UE, sidelink control information (SCI) including the sidelink COT sharing information. The sidelink COT sharing information indicates one or more frequency interlaces of resource blocks (RBs) in the shared radio frequency band available during the COT. The transmitting the sidelink includes transmitting, by the first UE to the third UE, the sidelink using a first frequency interlace of the one or more frequency interlaces during the COT. The method may include selecting, by the first UE, the first frequency interlace from the one or more frequency interlaces. The transmitting is based on the LBT. The sidelink COT sharing information indicates a gap period within the COT, and where the performing the LBT includes performing, by the first UE, the LBT during the gap period. The sidelink COT sharing information includes information associated with a channel access priority class (CAPC), and where the transmitting is based on the CAPC. The sidelink COT sharing information includes timing information associated with a sharing duration in the COT, and where the transmitting includes transmitting, by the first UE to the third UE, the sidelink within the sharing duration. The transmitting is based on the LBT. The sidelink COT sharing information includes timing information associated with contention slots in the sharing duration, and where the performing the LBT is further based on the timing information associated with the contention slots. The COT is a COT of the second UE. The COT is a COT of a fourth UE different from the second UE. The transmitting includes transmitting, by the first UE, sidelink control information (SCI) including at least some of the sidelink COT sharing information received from the second UE to propagate the sidelink COT sharing information.

Further embodiments of the present disclosure include a method of wireless communication. The method of wireless communication includes communicating, by a first user equipment (UE) with a second UE, sidelink data and sidelink control information (SCI) in a shared radio frequency band, the SCI including an indication of a listen-before-talk (LBT) type for communicating an acknowledgement/negative-acknowledgement (ACK/NACK) feedback for the sidelink data. The method of wireless communication also includes communicating, by the first UE with the second UE, the ACK/NACK feedback for the sidelink data based on the LBT type.

The method may also include one or more of the following features. For instance, the method includes where the communicating the sidelink data and the SCI includes communicating, by the first UE with the second UE, the sidelink data and the SCI during a channel occupancy time (COT) in the shared radio frequency band. The LBT type indicates a category 2 (CAT2) LBT based on resources for communicating the ACK/NACK feedback being within a duration of the COT. The LBT type indicates a category 4 (CAT4) LBT based on a resource for communicating the ACK/NACK feedback being outside a duration of the COT. The method may include determining, by the first UE, the COT in the shared radio frequency band. The SCI indicates a resource for communicating the ACK/NACK feedback. The communicating the sidelink data and the SCI includes transmitting, by the first UE to the second UE, the sidelink data and the SCI in the shared radio frequency band; and the communicating the ACK/NACK feedback includes receiving, by the first UE from the second UE, the ACK/NACK feedback in the shared radio frequency band. The communicating the sidelink data and the SCI includes receiving, by the first UE from the second UE, the sidelink data and the SCI in the shared radio frequency band; and the communicating the ACK/NACK feedback includes transmitting, by the first UE to the second UE, the ACK/NACK feedback in the shared radio frequency band.

Further embodiments of the present disclosure include a first user equipment (UE). The first user equipment includes a processor configured to determine a channel occupancy time (COT) in a shared radio frequency band for communicating a sidelink with a second UE. The first user equipment also includes a transceiver configured to transmit, to the second UE, the sidelink using first resources in the COT, the sidelink including COT sharing information for second resources in the COT.

The first UE may also include one or more of the following features. For instance, the first UE includes where the transceiver configured to transmit the sidelink is configured to transmit, to the second UE, sidelink data and sidelink control information (SCI) using the first resources, the SCI including the COT sharing information. The shared radio frequency band includes a plurality of frequency interlaces of resource blocks (RBs), and where the transceiver configured to transmit the sidelink is configured to transmit, to the second UE, the sidelink using the first resources including a first frequency interlace of the plurality of frequency interlaces during the COT. The COT sharing information indicates the second resources including a second frequency interlace of the plurality of frequency interlaces available during the COT. The COT sharing information indicates a gap period in the COT for performing a listen-before-talk (LBT) prior to using the second frequency interlace during the COT. The processor is further configured to refrain, from transmit in the shared radio frequency band during the gap period; and the transceiver is further configured to transmit, to a third UE, another sidelink using a third frequency interlace during the COT after the gap period. The processor configured to determine the COT is configured to determine the COT based on a listen-before-talk (LBT) associated with a channel access priority class (CAPC), and where the COT sharing information indicates the CAPC. The COT sharing information includes timing information associated with at least one of a duration of the COT or a duration of the second resources. The COT sharing information includes timing information associated with a set of contention slots in the duration of the second resources. The COT sharing information includes at least one of a starting time of an earliest contention slot of the set of contention slots, or a duration of a first contention slot of the set of contention slots.

Further embodiments of the present disclosure include a first user equipment (UE). The first user equipment includes a processor configured to monitor for sidelink channel occupancy time (COT) sharing information in a shared radio frequency band. The first user equipment also includes a transceiver configured to receive, from a second UE, the sidelink COT sharing information associated with a COT based on the monitoring; and transmit, to a third UE different from the second UE, a sidelink in the shared radio frequency band during the COT based on the COT sharing information.

The first UE may also include one or more of the following features. For instance, the first UE includes where the transceiver configured to receive the sidelink COT sharing information is configured to receive, from the second UE, sidelink control information (SCI) including the sidelink COT sharing information. The sidelink COT sharing information includes information associated with a channel access priority class (CAPC); and the transceiver configured to transmit the sidelink is configured to transmit the sidelink based on the CAPC. The sidelink COT sharing information includes timing information associated with a sharing duration in the COT; and the transceiver configured to transmit the sidelink is configured to transmit, to the third UE, the sidelink within the sharing duration. The processor is further configured to perform a listen-before-talk (LBT) in the shared radio frequency band; and the transceiver configured to transmit the sidelink is configured to transmit the sidelink based on the LBT. The sidelink COT sharing information includes timing information associated with contention slots in the sharing duration; and the processor configured to performing the LBT is configured to perform the LBT based on the timing information associated with the contention slots. The COT is a COT of the second UE. The COT is a COT of a fourth UE different from the second UE. The transceiver configured to transmit the sidelink is configured to transmit sidelink control information (SCI) including at least some of the sidelink COT sharing information received from the second UE to propagate the sidelink COT sharing information. The sidelink COT sharing information indicates one or more frequency interlaces of resource blocks (RBs) in the shared radio frequency band available during the COT. The transceiver configured to transmit the sidelink is configured to transmit, to the third UE, the sidelink using a first frequency interlace of the one or more frequency interlaces during the COT. The processor is further configured to select the first frequency interlace from the one or more frequency interlaces. The processor is further configured to perform a listen-before-talk (LBT) in the shared radio frequency band; and the transceiver configured to transmit the sidelink is configured to transmit the sidelink based on the LBT. The sidelink COT sharing information indicates a gap period within the COT; and the processor configured to perform the LBT is configured to perform the LBT during the gap period.

Further embodiments of the present disclosure include a first user equipment (UE). The first user equipment includes a transceiver configured to communicate, with a second UE, sidelink data and sidelink control information (SCI) in a shared radio frequency band, the SCI including an indication of a listen-before-talk (LBT) type for communicating an acknowledgement/negative-acknowledgement (ACK/NACK) feedback for the sidelink data; and communicate, with the second UE, the ACK/NACK feedback for the sidelink data based on the LBT type.

The first UE may also include one or more of the following features. For instance, the first UE includes where the transceiver configured to communicate the sidelink data and the SCI is configured to communicate, with the second UE, the sidelink data and the SCI during a channel occupancy time (COT) in the shared radio frequency band. The LBT type indicates a category 2 (CAT2) LBT based on resources for communicating the ACK/NACK feedback being within a duration of the COT. The LBT type indicates a category 4 (CAT4) LBT based on a resource for communicating the ACK/NACK feedback being outside a duration of the COT. The first UE may include a processor configured to determine the COT in the shared radio frequency band. The SCI indicates a resource for communicating the ACK/NACK feedback. The transceiver configured to communicate the sidelink data and the SCI is configured to transmit, to the second UE, the sidelink data and the SCI in the shared radio frequency band; and the transceiver configured to communicate the ACK/NACK feedback is configured to receive, from the second UE, the ACK/NACK feedback in the shared radio frequency band. The communicating the sidelink data and the SCI includes receive, from the second UE, the sidelink data and the SCI in the shared radio frequency band; and the communicating the ACK/NACK feedback includes transmit, to the second UE, the ACK/NACK feedback in the shared radio frequency band.

Further embodiments of the present disclosure include a non-transitory computer-readable medium having program code recorded thereon. The non-transitory computer-readable medium includes code for causing a first user equipment (UE) to determine a channel occupancy time (COT) in a shared radio frequency band for communicating sidelink with a second UE. The non-transitory computer-readable medium also includes code for causing the first UE to transmit, to the second UE, a sidelink using first resources in the COT, the sidelink including COT sharing information for second resources in the COT.

The non-transitory computer-readable medium may also include one or more of the following features. For instance, the non-transitory computer-readable medium includes where the code for causing the first UE to transmit the sidelink is configured to transmit, to the second UE, sidelink data and sidelink control information (SCI) using the first resources, the SCI including the COT sharing information. The shared radio frequency band includes a plurality of frequency interlaces of resource blocks (RBs), and where the code for causing the first UE to transmit the sidelink is configured to transmit, to the second UE, the sidelink using the first resources including a first frequency interlace of the plurality of frequency interlaces during the COT. The COT sharing information indicates the second resources including a second frequency interlace of the plurality of frequency interlaces available during the COT. The COT sharing information indicates a gap period in the COT for performing a listen-before-talk (LBT) prior to using the second frequency interlace during the COT. The non-transitory computer-readable medium may include code for causing the first UE to refrain, from transmit in the shared radio frequency band during the gap period; and code for causing the first UE to transmit, to a third UE, another sidelink using a third frequency interlace during the COT after the gap period. The code for causing the first UE to determine the COT is configured to determine the COT based on a listen-before-talk (LBT) associated with a channel access priority class (CAPC), and where the COT sharing information indicates the CAPC. The COT sharing information includes timing information associated with at least one of a duration of the COT or a duration of the second resources. The COT sharing information includes timing information associated with a set of contention slots in the duration of the second resources. The COT sharing information includes at least one of a starting time of an earliest contention slot of the set of contention slots, or a duration of first contention slot of the set of contention slots.

Further embodiments of the present disclosure include a non-transitory computer-readable medium having program code recorded thereon. The non-transitory computer-readable medium includes code for causing a first user equipment (UE) to monitor for sidelink channel occupancy time (COT) sharing information in a shared radio frequency band. The non-transitory computer-readable medium also includes code for causing the first UE to receive, from a second UE, the sidelink COT sharing information associated with a COT based on the monitoring. The non-transitory computer-readable medium also includes code for causing the first UE to transmit, to a third UE different from the second UE, a sidelink in the shared radio frequency band during the COT based on the COT sharing information.

The non-transitory computer-readable medium may also include one or more of the following features. For instance, the non-transitory computer-readable medium includes where the code for causing the first UE to receive the sidelink COT sharing information is configured to receive, from the second UE, sidelink control information (SCI) including the sidelink COT sharing information. The sidelink COT sharing information indicates one or more frequency interlaces of resource blocks (RBs) in the shared radio frequency band available during the COT. The code for causing the first UE to transmit the sidelink is configured to transmit, to the third UE, the sidelink using a first frequency interlace of the one or more frequency interlaces during the COT. The non-transitory computer-readable medium may include code for causing the first UE to select the first frequency interlace from the one or more frequency interlaces. The code for causing the first UE to transmit the sidelink is configured to transmit the sidelink based on the LBT. The sidelink COT sharing information indicates a gap period within the COT; and the code for causing the first UE to perform the LBT is configured to perform the LBT during the gap period. The sidelink COT sharing information includes information associated with a channel access priority class (CAPC); and the code for causing the first UE to transmit the sidelink is configured to transmit the sidelink based on the CAPC. The sidelink COT sharing information includes timing information associated with a sharing duration in the COT; and the code for causing the first UE to transmit the sidelink is configured to transmit, to the third UE, the sidelink within the sharing duration. The code for causing the first UE to transmit the sidelink is configured to transmit the sidelink based on the LBT. The sidelink COT sharing information includes timing information associated with contention slots in the sharing duration; and the code for causing the first UE to performing the LBT is configured to perform the LBT based on the timing information associated with the contention slots. The COT is a COT of the second UE. The COT is a COT of a fourth UE different from the second UE. The code for causing the first UE to transmit the sidelink is configured to transmit sidelink control information (SCI) including at least some of the sidelink COT sharing information received from the second UE to propagate the sidelink COT sharing information.

Further embodiments of the present disclosure include a non-transitory computer-readable medium having program code recorded thereon. The non-transitory computer-readable medium includes code for causing a first user equipment (UE) to communicate, with a second UE, sidelink data and sidelink control information (SCI) in a shared radio frequency band, the SCI including an indication of a listen-before-talk (LBT) type for communicating an acknowledgement/negative-acknowledgement (ACK/NACK) feedback for the sidelink data. The non-transitory computer-readable medium also includes code for causing the first UE to communicate, with the second UE, the ACK/NACK feedback for the sidelink data based on the LBT type.

The non-transitory computer-readable medium may also include one or more of the following features. For instance, the non-transitory computer-readable medium includes where the code for causing the first UE to communicate the sidelink data and the SCI is configured to communicate, with the second UE, the sidelink data and the SCI during a channel occupancy time (COT) in the shared radio frequency band. The LBT type indicates a category 2 (CAT2) LBT based on resources for communicating the ACK/NACK feedback being within a duration of the COT. The LBT type indicates a category 4 (CAT4) LBT based on a resource for communicating the ACK/NACK feedback being outside a duration of the COT. The non-transitory computer-readable medium may include code for causing the first UE to determine the COT in the shared radio frequency band. The SCI indicates a resource for communicating the ACK/NACK feedback. The code for causing the first UE to communicate the sidelink data and the SCI is configured to transmit, to the second UE, the sidelink data and the SCI in the shared radio frequency band; and the code for causing the first UE to communicate the ACK/NACK feedback is configured to receive, from the second UE, the ACK/NACK feedback in the shared radio frequency band. The code for causing the first UE to communicate the sidelink data and the SCI is configured to receive, from the second UE, the sidelink data and the SCI in the shared radio frequency band; and the code for causing the first UE to communicate the ACK/NACK feedback is configured to transmit, to the second UE, the ACK/NACK feedback in the shared radio frequency band.

Further embodiments of the present disclosure include a first user equipment (UE). The first user equipment includes means for determining a channel occupancy time (COT) in a shared radio frequency band for communicating sidelink with a second UE. The first user equipment also includes means for transmitting, to the second UE, the sidelink using first resources in the COT, the sidelink including COT sharing information for second resources in the COT.

The first UE may also include one or more of the following features. For instance, the first UE includes where the means for transmitting the sidelink is configured to transmit, to the second UE, sidelink data and sidelink control information (SCI) using the first resources, the SCI including the COT sharing information. The shared radio frequency band includes a plurality of frequency interlaces of resource blocks (RBs), and where the means for transmitting the sidelink is configured to transmit, to the second UE, the sidelink using the first resources including a first frequency interlace of the plurality of frequency interlaces during the COT. The COT sharing information indicates the second resources including a second frequency interlace of the plurality of frequency interlaces available during the COT. The COT sharing information indicates a gap period in the COT for performing a listen-before-talk (LBT) prior to using the second frequency interlace during the COT. The first UE may include means for refraining, from transmit in the shared radio frequency band during the gap period; and means for transmitting, to a third UE, another sidelink using a third frequency interlace during the COT after the gap period. The means for determining the COT is configured to determine the COT based on a listen-before-talk (LBT) associated with a channel access priority class (CAPC), and where the COT sharing information indicates the CAPC. The COT sharing information includes timing information associated with at least one of a duration of the COT or a duration of the second resources. The COT sharing information includes timing information associated with a set of contention slots in the duration of the second resources. The COT sharing information includes at least one of a starting time of an earliest contention slot of the set of contention slots, or a duration of a first contention slot of the set of contention slots.

Further embodiments of the present disclosure include a first user equipment (UE). The first user equipment includes means for monitoring for sidelink channel occupancy time (COT) sharing information in a shared radio frequency band. The first user equipment also includes means for receiving, from a second UE, the sidelink COT sharing information associated with a COT based on the monitoring. The first user equipment also includes means for transmitting, to a third UE different from the second UE, a sidelink in the shared radio frequency band during the COT based on the COT sharing information.

The first UE may also include one or more of the following features. For instance, the first UE includes where the means for receiving the sidelink COT sharing information is configured to receive, from the second UE, sidelink control information (SCI) including the sidelink COT sharing information. The sidelink COT sharing information indicates one or more frequency interlaces of resource blocks (RBs) in the shared radio frequency band available during the COT. The means for transmitting the sidelink is configured to transmit, to the third UE, the sidelink using a first frequency interlace of the one or more frequency interlaces during the COT. The first UE may include means for selecting the first frequency interlace from the one or more frequency interlaces. The means for transmitting the sidelink is configured to transmit the sidelink based on the LBT. The sidelink COT sharing information indicates a gap period within the COT; and the means for performing the LBT is configured to perform the LBT during the gap period. The sidelink COT sharing information includes information associated with a channel access priority class (CAPC); and the means for transmitting the sidelink is configured to transmit the sidelink based on the CAPC. The sidelink COT sharing information includes timing information associated with a sharing duration in the COT; and the means for transmitting the sidelink is configured to transmit, to the third UE, the sidelink within the sharing duration. The means for transmitting the sidelink is configured to transmit the sidelink based on the LBT. The sidelink COT sharing information includes timing information associated with contention slots in the sharing duration; and the means for performing the LBT is configured to perform the LBT based on the timing information associated with the contention slots. The COT is a COT of the second UE. The COT is a COT of a fourth UE different from the second UE. The means for transmitting the sidelink is configured to transmit sidelink control information (SCI) including at least some of the sidelink COT sharing information received from the second UE to propagate the sidelink COT sharing information.

Further embodiments of the present disclosure include a first user equipment (UE). The first user equipment also includes means for communicating, with a second UE, sidelink data and sidelink control information (SCI) in a shared radio frequency band, the SCI including an indication of a listen-before-talk (LBT) type for communicating an acknowledgement/negative-acknowledgement (ACK/NACK) feedback for the sidelink data. The first user equipment also includes means for communicating, with the second UE, the ACK/NACK feedback for the sidelink data based on the LBT type.

The first UE may also include one or more of the following features. For instance, the first UE where the means for communicating the sidelink data and the SCI is configured to communicate, with the second UE, the sidelink data and the SCI during a channel occupancy time (COT) in the shared radio frequency band. The LBT type indicates a category 2 (CAT2) LBT based on resources for communicating the ACK/NACK feedback being within a duration of the COT. The LBT type indicates a category 4 (CAT4) LBT based on a resource for communicating the ACK/NACK feedback being outside a duration of the COT. The first UE may include means for determining the COT in the shared radio frequency band. The SCI indicates a resource for communicating the ACK/NACK feedback. The means for communicating the sidelink data and the SCI is configured to transmit, to the second UE, the sidelink data and the SCI in the shared radio frequency band; and the means for communicating the ACK/NACK feedback is configured to receive, from the second UE, the ACK/NACK feedback in the shared radio frequency band. The means for communicating the sidelink data and the SCI is configured to receive, from the second UE, the sidelink data and the SCI in the shared radio frequency band; and the means for communicating the ACK/NACK feedback is configured to transmit, to the second UE, the ACK/NACK feedback in the shared radio frequency band.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    determining, by a first user equipment (UE), a channel occupancy time (COT) in a shared radio frequency band for communicating a sidelink communication with a second UE, wherein the determining is based on a listen-before-talk (LBT) procedure associated with a channel access priority class (CAPC); and
    transmitting, by the first UE to the second UE, the sidelink communication using first resources comprising a first frequency interlace in the COT, the sidelink communication comprising at least sidelink control information (SCI), wherein:
    the SCI comprises COT sharing information for second resources in the COT and information indicating the CAPC;
    the second resources comprise a plurality of frequency interlaces including a second frequency interlace different from the first frequency interlace; and
    the COT sharing information comprises an indicator indicating the plurality of frequency interlaces including the second frequency interlace are available to the second UE for sharing the COT.
2. The method of claim 1, wherein the shared radio frequency band comprises the plurality of frequency interlaces of resource blocks (RBs).

3. The method of claim 2, wherein the COT sharing information indicates the second resources comprising a second frequency interlace of the plurality of frequency interlaces are available during the COT.

4. The method of claim 3, wherein:
    the COT sharing information indicates a gap period in the COT for performing a listen-before-talk (LBT) procedure prior to using the second frequency interlace during the COT; and
    the method further comprises:
    refraining, by the first UE, from transmitting in the shared radio frequency band during the gap period; and
    transmitting, by the first UE to a third UE, another sidelink communication using a third frequency interlace of the plurality of frequency interlaces during the COT after the gap period.

5. The method of claim 1, wherein the determining is based on a listen-before-talk (LBT) procedure associated with a channel access priority class (CAPC), and wherein the COT sharing information indicates the CAPC.

6. The method of claim 1, wherein the COT sharing information comprises timing information associated with at least one of a duration of the COT or a duration of the second resources.

7. The method of claim 6, wherein the COT sharing information further comprises:
    timing information associated with a set of contention slots in the duration of the second resources; or
    at least one of a starting time of an earliest contention slot of the set of contention slots, or a duration of a first contention slot of the set of contention slots.

8. A method of wireless communication, comprising:
    monitoring, by a first user equipment (UE), for sidelink channel occupancy time (COT) sharing information in a shared radio frequency band;
    receiving, by the first UE from a second UE using first resources comprising a first frequency interlace, sidelink control information (SCI) comprising the sidelink COT sharing information associated with a COT based on the monitoring and further comprising information indicating a channel access priority class (CAPC);
    selecting, by the first UE, a second frequency interlace from one or more frequency interlaces;
    transmitting, by the first UE to a third UE different from the second UE, a sidelink communication in the shared radio frequency band using second resources comprising the second frequency interlace during the COT based on the COT sharing information, wherein:
    the second resources comprises the one or more frequency interlaces different from the first frequency interlace;
    the COT sharing information comprises an indicator indicating the one or more frequency interlaces are available to the second UE for sharing the COT; and
    the COT is determined based on a listen-before-talk (LBT) procedure associated with the CAPC.

9. The method of claim 8, wherein the sidelink COT sharing information indicates the one or more frequency interlaces of resource blocks (RBs) in the shared radio frequency band are available during the COT.

10. The method of claim 8, further comprising:
    selecting, by the first UE, the second frequency interlace from the one or more frequency interlaces.

11. The method of claim 8, wherein:
the sidelink COT sharing information indicates a gap period within the COT;
the method further comprises:
performing, by the first UE during the gap period, a listen-before-talk (LBT) procedure in the shared radio frequency band; and
the transmitting the sidelink communication is based on the LBT procedure being successful.

12. The method of claim 8, wherein:
the sidelink COT sharing information comprises at least one of information associated with a channel access priority class (CAPC) or timing information associated with a sharing duration in the COT; and
the transmitting is based on the at least one of the CAPC or the sharing duration.

13. The method of claim 8, wherein:
the sidelink COT sharing information comprises timing information associated with contention slots in a sharing duration within the COT;
the method further comprises:
performing, by the first UE based on the timing information associated with the contention slots, a listen-before-talk (LBT) procedure in the shared radio frequency band; and
the transmitting is based on the LBT procedure being successful.

14. The method of claim 8, wherein the COT is a COT of the second UE or a COT of a fourth UE different from the second UE.

15. The method of claim 8, wherein the transmitting the sidelink communication comprises:
transmitting, by the first UE, second SCI comprising at least some of the sidelink COT sharing information received from the second UE to propagate the sidelink COT sharing information.

16. A first user equipment (UE) comprising:
a processor configured to determine a channel occupancy time (COT) in a shared radio frequency band for communicating a sidelink communication with a second UE, wherein the determining is based on a listen-before-talk (LBT) procedure associated with a channel access priority class (CAPC); and
a transceiver configured to transmit, to the second UE, the sidelink communication using first resources comprising a first frequency interlace in the COT, the sidelink communication comprising at least sidelink control information (SCI), wherein:
the SCI comprises COT sharing information for second resources in the COT and information indicating the CAPC;
the second resources comprise a plurality of frequency interlaces including a second frequency interlace different from the first frequency interlace; and
the COT sharing information comprises an indicator indicating the plurality of frequency interlaces including the second frequency interlace are available to the second UE for sharing the COT.

17. The first UE of claim 16, wherein the shared radio frequency band comprises the plurality of frequency interlaces of resource blocks (RBs).

18. The first UE of claim 17, wherein the COT sharing information indicates the second resources comprising a second frequency interlace of the plurality of frequency interlaces are available during the COT.

19. The first UE of claim 18, wherein:
the COT sharing information indicates a gap period in the COT for performing a listen-before-talk (LBT) procedure prior to using the second frequency interlace during the COT;
the processor is further configured to:
refrain, from transmitting in the shared radio frequency band during the gap period; and
the transceiver is further configured to:
transmit, to a third UE, another sidelink communication using a third frequency interlace of the plurality of frequency interlaces during the COT after the gap period.

20. The first UE of claim 16, wherein the processor configured to determine the COT is further configured to:
determine the COT based on a listen-before-talk (LBT) procedure associated with a channel access priority class (CAPC), and wherein the COT sharing information indicates the CAPC.

21. The first UE of claim 16, wherein the COT sharing information comprises timing information associated with at least one of a duration of the second resources, a set of contention slots in the duration of the second resources, a starting time of an earliest contention slot of the set of contention slots, or a duration of a first contention slot of the set of contention slots.

22. A first user equipment (UE) comprising:
a processor configured to monitor for sidelink channel occupancy time (COT) sharing information in a shared radio frequency band; and
a transceiver configured to:
receive, from a second UE using first resources comprising a first frequency interlace, sidelink control information (SCI) comprising the sidelink COT sharing information associated with a COT based on the monitoring and further comprising information indicating a channel access priority class (CAPC); and
select, by the first UE, a second frequency interlace from one or more frequency interlaces;
transmit, to a third UE different from the second UE, a sidelink communication in the shared radio frequency band using second resources comprising the second frequency interlace during the COT based on the COT sharing information, wherein:
the second resources comprise one or more frequency interlaces different from the first frequency interlace, and
the COT sharing information comprises an indicator indicating the one or more frequency interlaces are available to the second UE for sharing the COT; and
the COT is determined based on a listen-before-talk (LBT) procedure associated with the CAPC.

23. The first UE of claim 22, wherein the sidelink COT sharing information indicates the one or more frequency interlaces of resource blocks (RBs) in the shared radio frequency band are available during the COT.

24. The first UE of claim 22, wherein the processor is further configured to:
select the second frequency interlace from the one or more frequency interlaces.

25. The first UE of claim 22, wherein:
the sidelink COT sharing information indicates a gap period within the COT;
the processor is further configured to:
perform, during the gap period, a listen-before-talk (LBT) procedure in the shared radio frequency band; and the transceiver configured to transmit the sidelink communication is configured to:
  transmit the sidelink communication based on the LBT procedure being successful.

26. The first UE of claim 22, wherein:
the sidelink COT sharing information comprises at least one of information associated with a channel access priority class (CAPC) or timing information associated with a sharing duration in the COT; and
the transceiver configured to transmit the sidelink communication is configured to:
  transmit the sidelink communication based on the at least one of the CAPC or the sharing duration.

27. The first UE of claim 22, wherein:
the sidelink COT sharing information comprises timing information associated with contention slots in a sharing duration within the COT;
the processor is further configured to:
  perform, based on the timing information associated with the contention slots, a listen-before-talk (LBT) procedure in the shared radio frequency band; and
the transceiver configured to transmit the sidelink communication is configured to:
  transmit the sidelink communication based on the LBT procedure being successful.

28. The first UE of claim 22, wherein the COT is a COT of the second UE or a fourth UE different from the second UE.

* * * * *